(12) United States Patent
Raghavan et al.

(10) Patent No.: US 9,649,744 B2
(45) Date of Patent: May 16, 2017

(54) REDUCING SMALL COLLOIDAL PARTICLE CONCENTRATIONS IN FEED AND/OR BYPRODUCT FLUIDS IN THE CONTEXT OF WATERJET PROCESSING

(71) Applicant: OMAX Corporation, Kent, WA (US)

(72) Inventors: Chidambaram Raghavan, Seattle, WA (US); Tanner Coker, Maple Valley, WA (US); Ann Thomas, Irvine, CA (US); James M. O'Connor, Bellevue, WA (US); John H. Olsen, Vashon, WA (US)

(73) Assignee: OMAX Corporation, Kent, WA (US)

( * ) Notice: Subject to any disclaimer, the term of this patent is extended or adjusted under 35 U.S.C. 154(b) by 0 days.

(21) Appl. No.: 14/634,643

(22) Filed: Feb. 27, 2015

(65) Prior Publication Data

US 2015/0174732 A1   Jun. 25, 2015

Related U.S. Application Data

(63) Continuation of application No. PCT/US2014/048924, filed on Jul. 30, 2014, which is
(Continued)

(51) Int. Cl.
*B24C 7/00* (2006.01)
*B24C 9/00* (2006.01)
*B24C 1/04* (2006.01)

(52) U.S. Cl.
CPC .............. *B24C 9/006* (2013.01); *B24C 1/045* (2013.01); *B24C 7/003* (2013.01); *B24C 7/0007* (2013.01); *B24C 7/0015* (2013.01); *Y02P 70/179* (2015.11)

(58) Field of Classification Search
CPC ......... B24C 9/006; B24C 7/0007; B24C 9/00; B24C 7/00; B24C 1/00
(Continued)

(56) References Cited

U.S. PATENT DOCUMENTS 4,049,545 A   9/1977 Horvath
4,216,906 A   8/1980 Olsen et al.
(Continued)

FOREIGN PATENT DOCUMENTS

CN   101357809 A   2/2009
CN   201785277 U   4/2011
(Continued)

OTHER PUBLICATIONS

Bakalar, Tomas et al., "Heavy Metal Removal Using Reverse Osmosis," Acta Montanistica Slovaca Rocnik 14 (2009), cislo 3, 250-253.
(Continued)

*Primary Examiner* — Robert Rose
(74) *Attorney, Agent, or Firm* — Perkins Coie LLP

(57) ABSTRACT

A waterjet system in accordance with a particular embodiment includes a pressurizing device configured to pressurize a fluid, a cutting head downstream from the pressurizing device, and a catcher positioned to collect a jet from the cutting head. The system can further include a treatment assembly configured to treat a feed fluid to the pressurizing device and/or a byproduct fluid from the catcher, such as by removing submicron colloidal particles from the feed fluid and/or from the byproduct fluid. For example, the treatment assembly can include a coagulation unit, such as a chemical coagulation unit or an electrocoagulation unit, configured to coagulate the submicron colloidal particles. The pressurizing device, the cutting head, and the treatment assembly can be at different respective portions of a fluid-recycling loop.

25 Claims, 13 Drawing Sheets

Related U.S. Application Data a continuation-in-part of application No. 14/228,007, filed on Mar. 27, 2014, now Pat. No. 9,011,204.

(60) Provisional application No. 61/860,166, filed on Jul. 30, 2013, provisional application No. 61/940,212, filed on Feb. 14, 2014.

(58) Field of Classification Search
USPC .............. 451/75, 87, 88, 99, 2, 60, 446
See application file for complete search history.

(56) References Cited

U.S. PATENT DOCUMENTS

| | | | |
|---|---|---|---|
| 4,280,913 A | 7/1981 | Applegate et al. | |
| 4,547,286 A | 10/1985 | Hsiung | |
| 4,742,623 A | 5/1988 | Meurer et al. | |
| 4,802,993 A | 2/1989 | Katoh et al. | |
| 4,872,975 A * | 10/1989 | Benson | B24C 9/006 |
| | | | 210/104 |
| 5,647,989 A | 7/1997 | Hayashi et al. | |
| 5,679,058 A | 10/1997 | Rhoades | |
| 5,928,493 A | 7/1999 | Morkovsky et al. | |
| 6,001,265 A | 12/1999 | Toyama et al. | |
| 6,248,369 B1 | 6/2001 | Nier et al. | |
| 6,299,510 B1 | 10/2001 | Massenburg | |
| 6,328,638 B1 | 12/2001 | Hopkins et al. | |
| 6,346,197 B1 | 2/2002 | Stephenson et al. | |
| 6,361,416 B1 | 3/2002 | Hopkins et al. | |
| 6,607,670 B2 * | 8/2003 | Baldwin | C02F 1/56 |
| | | | 210/714 |
| 6,746,593 B2 | 6/2004 | Herbst et al. | |
| 6,804,459 B2 | 10/2004 | Raghavan et al. | |
| 7,014,770 B2 | 3/2006 | Umezawa et al. | |
| 7,138,063 B1 | 11/2006 | Teter et al. | |
| 7,465,215 B2 | 12/2008 | Shimizu et al. | |
| 7,758,742 B2 | 7/2010 | Powell | |
| 7,959,790 B2 | 6/2011 | Woytowich et al. | |
| 7,981,301 B2 | 7/2011 | Powell | |
| 8,048,279 B2 | 11/2011 | Powell et al. | |
| 9,011,204 B2 | 4/2015 | Raghavan et al. | |
| 2002/0028634 A1 | 3/2002 | Massenburg | |
| 2006/0219825 A1 | 10/2006 | Rohring et al. | |
| 2007/0037495 A1 * | 2/2007 | Matsubara | B24C 9/006 |
| | | | 451/75 |
| 2009/0042492 A1 * | 2/2009 | Hashish | B24C 1/045 |
| | | | 451/87 |
| 2009/0229793 A1 | 9/2009 | Trieb et al. | |
| 2012/0145647 A1 | 6/2012 | Volkel et al. | |
| 2012/0160706 A1 | 6/2012 | Poirier et al. | |

FOREIGN PATENT DOCUMENTS

| | | |
|---|---|---|
| CN | 102139978 A | 8/2011 |
| CN | 202415300 U | 9/2012 |
| EP | 0761603 A1 | 3/1997 |
| GB | 2483740 A | 3/2012 |
| WO | 2010122336 A2 | 10/2010 |

OTHER PUBLICATIONS

Hashish, M., "Waterjet Machine Tool of the Future," 9th American Waterjet Conference, Aug. 23-26, 1997, Paper 58, 15 pages.
International Searching Authority, International Search Report and Written Opinion for International Application No. PCT/US2014/048924, mailed Nov. 12, 2014, 20 pages.

* cited by examiner

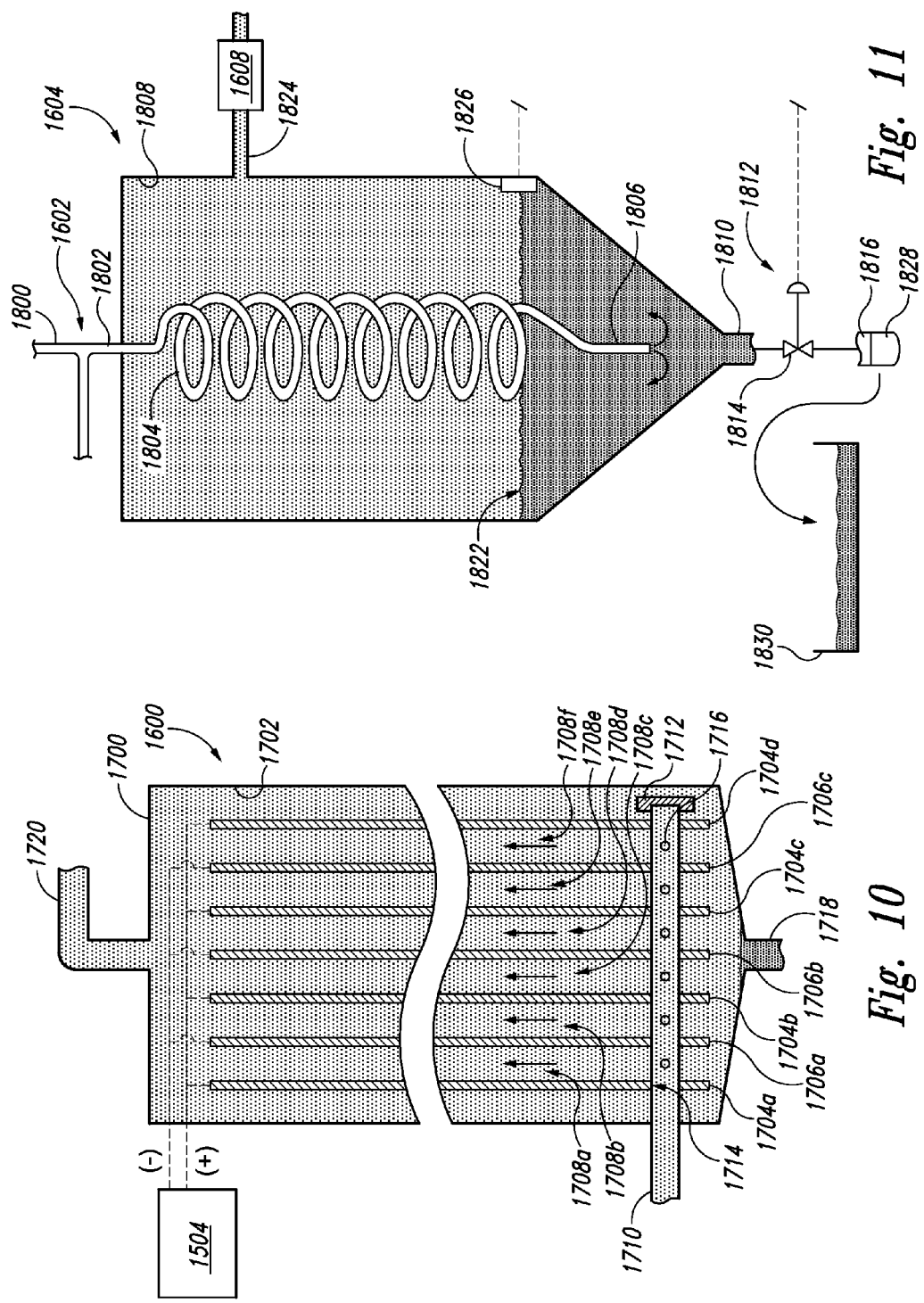

REDUCING SMALL COLLOIDAL PARTICLE CONCENTRATIONS IN FEED AND/OR BYPRODUCT FLUIDS IN THE CONTEXT OF WATERJET PROCESSING

CROSS-REFERENCE TO RELATED APPLICATIONS INCORPORATED BY REFERENCE

This application is a continuation of pending PCT Application No. PCT/US2014/048924, filed Jul. 30, 2014, which: (1) claims the benefit of U.S. Provisional Application No. 61/860,166, filed Jul. 30, 2013; (2) claims the benefit of U.S. Provisional Application No. 61/940,212, filed Feb. 14, 2014; and (3) is a continuation-in-part of pending U.S. Utility application Ser. No. 14/228,007, filed Mar. 27, 2014. The foregoing applications are incorporated herein by reference in their entireties. To the extent the foregoing applications or any other material incorporated herein by reference conflicts with the present disclosure, the preset disclosure controls.

TECHNICAL FIELD

The present technology is generally related to the treatment of feed and/or byproduct fluids in the context of waterjet processing, such as clarifying feed and/or byproduct fluids in this context by coagulation or in another suitable manner.

BACKGROUND

Waterjet systems (e.g., abrasive jet systems) are used in precision cutting, shaping, carving, reaming, and other material-processing applications. During operation, waterjet systems typically direct a high-velocity jet of fluid (e.g., liquid water containing particles of abrasive material) toward a workpiece to rapidly erode portions of the workpiece. When compared to other material-processing technologies (e.g., grinding, plasma-cutting, etc.) waterjet processing can have significant advantages. For example, waterjet systems often produce relatively fine and clean cuts, typically without heat-affected zones around the cuts. Waterjet systems also tend to be highly versatile with respect to the material type of the workpiece. The range of materials that can be processed using waterjet systems includes very soft materials (e.g., rubber, foam, leather, and paper) as well as very hard materials (e.g., stone, ceramic, and hardened metal). Furthermore, in many cases, waterjet systems are capable of executing demanding material-processing operations while generating little or no dust, smoke, or other potentially toxic airborne byproducts.

In a typical waterjet system, a pressurizing device (e.g., a direct-drive plunger pump or an intensifier) pressurizes fluid to an ultrahigh pressure, such as a pressure within a range from 30,000 psi to 100,000 psi or more. Some of this pressurized fluid is routed through a cutting head that includes an orifice element having an orifice. The orifice element can be a hard jewel (e.g., a synthetic sapphire, ruby, or diamond) held in a suitable mount, such as a metal plate. Passing through the orifice converts static pressure of the fluid into kinetic energy, which causes the fluid to exit the cutting head as a jet at a high velocity (e.g., a velocity of up to 2,500 feet-per-second or more) and impact a workpiece. In some cases, an abrasive material (e.g., garnet or silica) is entrained within the formed jet at a mixing chamber within the cutting head. Alternatively, and less typically, the fluid can already contain entrained abrasive material before it reaches the cutting head. The use of abrasive material tends to facilitate erosive cutting, particularly for relatively dense workpiece materials. After eroding through a portion of the workpiece, the jet typically is dispersed in a fluid pool held within a catcher positioned below the workpiece, thereby allowing the kinetic energy of the jet to dissipate. A jig including spaced-apart slats can be used to support the workpiece over the catcher. The jig, the cutting head, the workpiece, or a combination thereof can be movable under computer and/or robotic control such that complex processing instructions can be executed automatically.

Conventionally, in the context of waterjet processing, using a feed fluid with relatively high hardness and/or a relatively high concentration of total dissolved solids ("TDS") is considered to be undesirable. This practice, for example, is thought to increase mineral precipitation (e.g., scaling) on surfaces within waterjet systems. Ultrahigh pressures may exacerbate this problem by decreasing the solubility of certain dissolved solids. It is thought that, over time, flakes of mineral precipitate may clog or otherwise damage fluidic components of waterjet systems. Accordingly, some manufacturers of waterjet systems recommend using municipal water as a feed fluid and periodically testing the hardness and the TDS concentration of the water. If the hardness and/or the TDS concentration of the water is too high, softening by ion exchange and/or partial deionization by ion exchange or reverse osmosis may be recommended. Manufacturers of waterjet systems do not recommend complete or near-complete deionization of feed fluids because this is known to cause the feed fluids to become corrosive. For example, instead of depositing mineral precipitates on surfaces within waterjet systems, completely or nearly-completely deionized feed fluids may tend to leach material (e.g., metal) from these surfaces. In addition to controlling the hardness and the TDS concentration of feed fluids, filtering feed fluids with 0.4 micron bag filters to trap large particles upstream from pressurizing devices of waterjet systems is also known. Thus, conventional approaches to treating feed fluids in the context of waterjet processing focus on the hardness of the feed fluids, the TDS concentration of the feed fluids, and the presence of large particles in the feed fluids. As discussed below, these approaches may be less effective, less efficient, and/or have other disadvantages relative to approaches in accordance with embodiments of the present technology.

Independent of the treatment of feed fluids, byproduct fluids in the context of waterjet processing may have characteristics that present technical challenges. When a jet including abrasive material disperses in a fluid pool, fluid and particles of abrasive material within the jet become incorporated into the fluid pool. In at least some cases, particles of workpiece material liberated from processed workpieces are also incorporated into the fluid pool. Eventually, the particles of abrasive material and/or workpiece material accumulate in the fluid pool to unacceptable levels. Draining and disposing of the fluid pool is wasteful and can be costly when environmental issues preclude direct disposal into municipal sewer lines. Environmental issues are common, for example, when waterjet systems are used to process workpieces made of toxic materials. Some approaches to treating byproduct fluids in the context of waterjet processing for disposal or reuse are known. These approaches may rely heavily on filtration. As with conventional approaches to treating feed fluids, conventional approaches to treating byproduct fluids in the context of waterjet processing may be less effective, less efficient, and/or have other disadvantages relative to approaches in accordance with embodiments of the present technology.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology. For ease of reference, throughout this disclosure identical reference numbers may be used to identify identical or at least generally similar or analogous components or features.

FIG. 10 is a cross-sectional profile view of an electrocoagulation unit of the treatment assembly of the waterjet system shown in FIG. 8.

FIG. 11 is a partially cross-sectional profile view of a separation unit of the treatment assembly of the waterjet system shown in FIG. 8.

DETAILED DESCRIPTION

Figure 1:
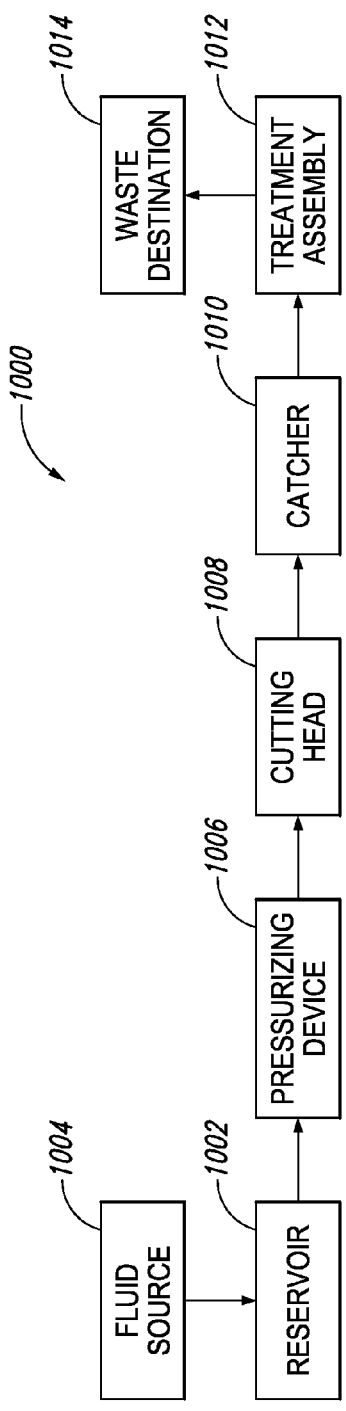
FIG. 1 is a block diagram illustrating a waterjet system in accordance with an embodiment of the present technology including a treatment assembly and having a first arrangement in which the treatment assembly is configured to treat a byproduct fluid.

In the context of waterjet processing, the inventors have discovered a dramatic and unexpected phenomenon associated with a characteristic of feed fluids that has been previously overlooked or at least underappreciated. As discussed above, attention to the quality of feed fluids in the context of waterjet processing has previously focused on the hardness of the feed fluids, the TDS concentration of the feed fluids, and the presence of large particles in the feed fluids. The inventors have discovered, however, a strong correlation between the concentration of small colloidal particles in feed fluids and the service life of seals within pressurizing devices of waterjet systems. For example, in an experiment, targeted removal of small colloidal particles in liquid water fed to an ultrahigh pressure direct-drive plunger pump was shown to reduce average material loss per million stokes from seals within the pump to nearly negligible levels. This is an important discovery for the waterjet industry. The need to frequently replace pump seals in conventional waterjet systems is a common problem that causes significant labor, system downtime, and other costs. These costs can cause the economy of waterjet processing to compare unfavorably to that of other material-processing technologies for certain applications. Accordingly, reducing or eliminating these costs is highly desirable. Furthermore, the observed correlation suggests that other benefits may be associated with reducing the concentration of small colloidal particles in feed fluids in the context of waterjet processing. These benefits may become known over time as waterjet systems in accordance with embodiments of the present technology are deployed in the field and put to heavy long-term use.

There are several possible explanations for the conventional failure to recognize or at least to fully appreciate the detrimental effect of small colloidal particles in feed fluids in the context of waterjet processing. As one possibility, it may have been thought that the size of these particles would preclude their involvement in wear processes occurring within fluidic components of waterjet systems. As another possibility, the relatively low concentrations of these particles in typical sources of feed fluids, such as municipal water supplies, may have discounted their perceived significance. Colloidal particles in drinking water are generally considered to be a greater threat to human health than dissolved solids. Thus, in most municipal water, the concentration of colloidal particles is carefully monitored and aggressively lowered to consistent levels according to standards mandated by government agencies. In contrast, controlling TDS concentration in municipal water is often voluntary. TDS concentration is known to vary widely among municipalities. In most municipal water, the weight-to-volume concentration of dissolved solids is much higher (e.g., 10 to 20 times higher) than the weight-to-volume concentration of colloidal particles.

In any case, the conventional failure to recognize or at least to fully appreciate the detrimental effect of small colloidal particles in feed fluids in the context of waterjet processing contributed to the development of ineffective, inefficient, and/or otherwise inadequate treatment protocols. The most common conventional protocols for treating feed fluids in this context include ion exchange and simple coarse filtration. These protocols do not significantly decrease the concentration of small colloidal particles in feed fluids. Reverse osmosis can be used to significantly decrease the concentration of small colloidal particles in feed fluids, but its conventional use in the context of waterjet processing tends to be wasteful and expensive. Furthermore, high concentrations of small colloidal particles in feed fluids treated by reverse osmosis would quickly overwhelm reverse osmosis filter membranes, thereby increasing the cost of reverse osmosis and decreasing its practicality. With respect to feed fluids most in need of treatment (i.e., those with the highest concentrations of small colloidal particles), the economic disincentives to use reverse osmosis are greater than they are with respect to feed fluids least in need of treatment (i.e., those with the lowest concentrations of small colloidal particles). For this reason, reverse osmosis is not conventionally used to treat byproduct fluids from waterjet processing, which, as discussed below, are often heavily laden with small colloidal particles.

By recognizing that reducing the concentration of small colloidal particles, rather than merely reducing the hardness, the TDS concentration, or the presence of large particles, should be the primary focus of treating feed fluids in the context of waterjet processing, the inventors have been able to develop advantageous new treatment protocols useful in a broad spectrum of waterjet applications. At least some of these protocols include coagulation, such as chemical coagulation or electrocoagulation. By way of theory, and not wishing to be bound by theory or to otherwise limit the scope of the present technology, small colloidal particles may carry a charge that tends to cause these particles to repel one another. Coagulation can include neutralizing or at least reducing this charge, thereby allowing the small colloidal particles to coagulate in response to intermolecular attractive forces (e.g., van der Waals' force) into larger particles that can be more easily removed from a fluid. For example, in the case of chemical coagulation, a chemical coagulant added to a fluid including small colloidal particles may interact with the particles to cause the particles to coagulate. As another example, in the case of electrocoagulation, electrodes may be used to release metal ions into a fluid and small colloidal particles within the fluid may coagulate by interacting with the metal ions, with surfaces of the electrodes, and/or with electrolysis products associated with operation of the electrodes.

In addition to or instead of treating feed fluids in the context of waterjet processing, at least some embodiments of the present technology can be used to treat byproduct fluids. Ironically, while waterjet systems have been discovered to be exceptionally sensitive to the presence of small colloidal particles in feed fluids, the same systems also tend to be exceptionally prone to generating these particles in byproduct fluids. For example, particles of abrasive material entrained in a jet often break apart into small fragments when the jet impacts a workpiece. Similarly, small fragments of workpiece material may be liberated from a workpiece when a jet impacts the workpiece. Most abrasive materials and many workpiece materials are relatively brittle. Such materials may be more prone to this behavior than other, more ductile materials. Furthermore, the extreme impact forces associated with waterjet processing may cause the fragmentation of abrasive materials and/or workpiece materials to be relatively widespread and aggressive, resulting in unusually high numbers of fragments and unusually small fragment sizes. The small fragments that result from waterjet processing tend to form highly persistent small colloidal particles that complicate reuse or disposal of byproduct fluids. Mechanisms for comparably prolific generation of small colloidal particles may not exist, or at least may not exist to the same degree, in other material-processing applications. Albeit unlikely, if any other material-processing applications are, in fact, comparable to waterjet applications with respect to their tendency to generate small colloidal particles, at least some embodiments of the present technology are expected to be useful in such applications.

Some types of contamination within byproduct fluids in the context of waterjet processing are relatively straightforward to remove. For example, large particles of abrasive material, workpiece material, or other types of material may tend to sink or float in a fluid pool within a catcher of a waterjet system. These particles can be dredged or skimmed from the catcher before the fluid pool is drained. Alternatively, these particles can be shoveled, vacuumed, or otherwise collected from the catcher after the fluid pool is drained. In some cases, recovered large particles of abrasive material are processed and recycled. For example, recovered large particles of abrasive material can often be dried, screened, and reused for the same or a different material-processing application. In other cases, recovered large particles of abrasive material may be disposed of as solid waste. After most or all large particles of abrasive material and/or workpiece material have been removed from a byproduct fluid, the remaining byproduct fluid may still be heavily contaminated. Treating this remaining byproduct fluid to produce a product having sufficient purity for reuse as a feed fluid in the same or a different waterjet system is not trivial. This is particularly true given the inventors' discoveries that waterjet systems tend to be highly sensitive to the presence of small colloidal particles in feed fluids even at relatively low concentrations and that waterjet applications are exceptionally prone to generating problematic small colloidal particles. In some cases, even simply treating a remaining byproduct fluid to produce a product having sufficient purity for direct disposal into a municipal sewer line may be technically challenging.

Systems, devices, and methods in accordance with embodiments of the present technology can at least partially address one or more of the problems described above and/or other problems associated with conventional technologies whether or not stated herein. For example, waterjet systems in accordance with at least some embodiments of the present technology have features that facilitate fluid recycling at relatively low cost and without unduly compromising performance or durability. Specific details of systems, devices, and methods in accordance with several embodiments of the present technology are disclosed herein with reference to FIGS. 1-16. Although the systems, devices, and methods may be disclosed herein primarily or entirely with respect to waterjet applications, other applications in addition to those disclosed herein are within the scope of the present technology. Furthermore, it should understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology.

Waterjet systems in accordance with embodiments of the present technology can be used with a variety of suitable fluids, such as water, aqueous solutions, hydrocarbons, glycols, and nitrogen. As such, although the term "waterjet" is used herein for ease of reference, unless the context clearly indicates otherwise, the term refers to a jet formed by any suitable fluid, and is not limited exclusively to water or aqueous solutions. The term "fluid," as used herein, encompasses any suitable fluid phase depending on the context. Furthermore, the term "fluid," as used herein, may be substituted in suitable instances with any of the narrower terms "aqueous fluid," "water," "liquid," "aqueous liquid," and "liquid water" to indicate common examples of suitable fluids in the context of waterjet processing.

References herein to "ultrahigh pressures" refer to pressures suitable for waterjet processing. For example, the "ultrahigh pressures" described herein can be pressures greater than 30,000 psi, such as pressures within a range from 30,000 psi to 120,000 psi. References herein to "small colloidal particles" refer to particles that are (a) smaller than typical particles conventionally targeted for removal from feed fluids by simple coarse filtration in the context of waterjet processing and (b) larger than typical ions conventionally targeted for removal from feed fluids by ion exchange in the context of waterjet processing. For example, the "small colloidal particles" described herein can be colloidal particles having an average sieve diameter within a range from 0.002 to 0.4 microns or colloidal particles otherwise consistent with the smallest fraction of colloidal fragments of abrasive material that commonly result from waterjet processing. Furthermore, the phrase "small colloidal particles," as used herein, may be substituted in suitable instances with any of the narrower phrases "small fragments of abrasive material," "submicron fragments of abrasive material," "small particles of pulverized abrasive material" and "submicron particles of pulverized abrasive material" to indicate common examples of relevant small colloidal particles in the context of waterjet processing.

Selected Examples of Waterjet Systems

Figure 2:
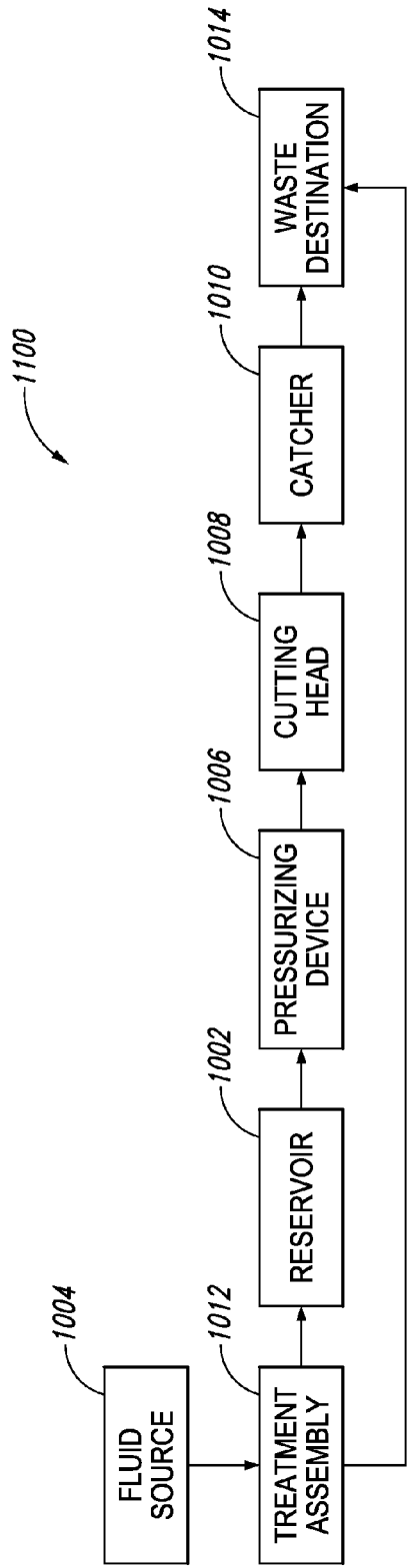
FIG. 2 is a block diagram illustrating a waterjet system in accordance with an embodiment of the present technology including a treatment assembly and having a second arrangement in which the treatment assembly is configured to treat a feed fluid.

FIG. 1 is a block diagram illustrating a waterjet system 1000 in accordance with an embodiment of the present technology. The system 1000 can include a reservoir 1002 configured to receive a fluid from a fluid source 1004. The system 1000 can further include a pressurizing device 1006, a cutting head 1008, a catcher 1010, and a treatment assembly 1012 operably connected to one another and to the reservoir 1002 at successively further positions downstream from the reservoir 1002. In the illustrated embodiment, the system 1000 has a first arrangement in which the treatment assembly 1012 is configured to treat a fluid from the catcher 1010 and then to discharge the fluid to a waste destination 1014. Waterjet systems in accordance with other embodiments of the present technology can have other suitable arrangements. For example, FIG. 2 is a block diagram illustrating a waterjet system 1100 in accordance with an embodiment of the present technology having a second arrangement in which the treatment assembly 1012 is upstream from the reservoir 1002 and configured to treat a feed fluid from the fluid source 1004.

Figure 3:
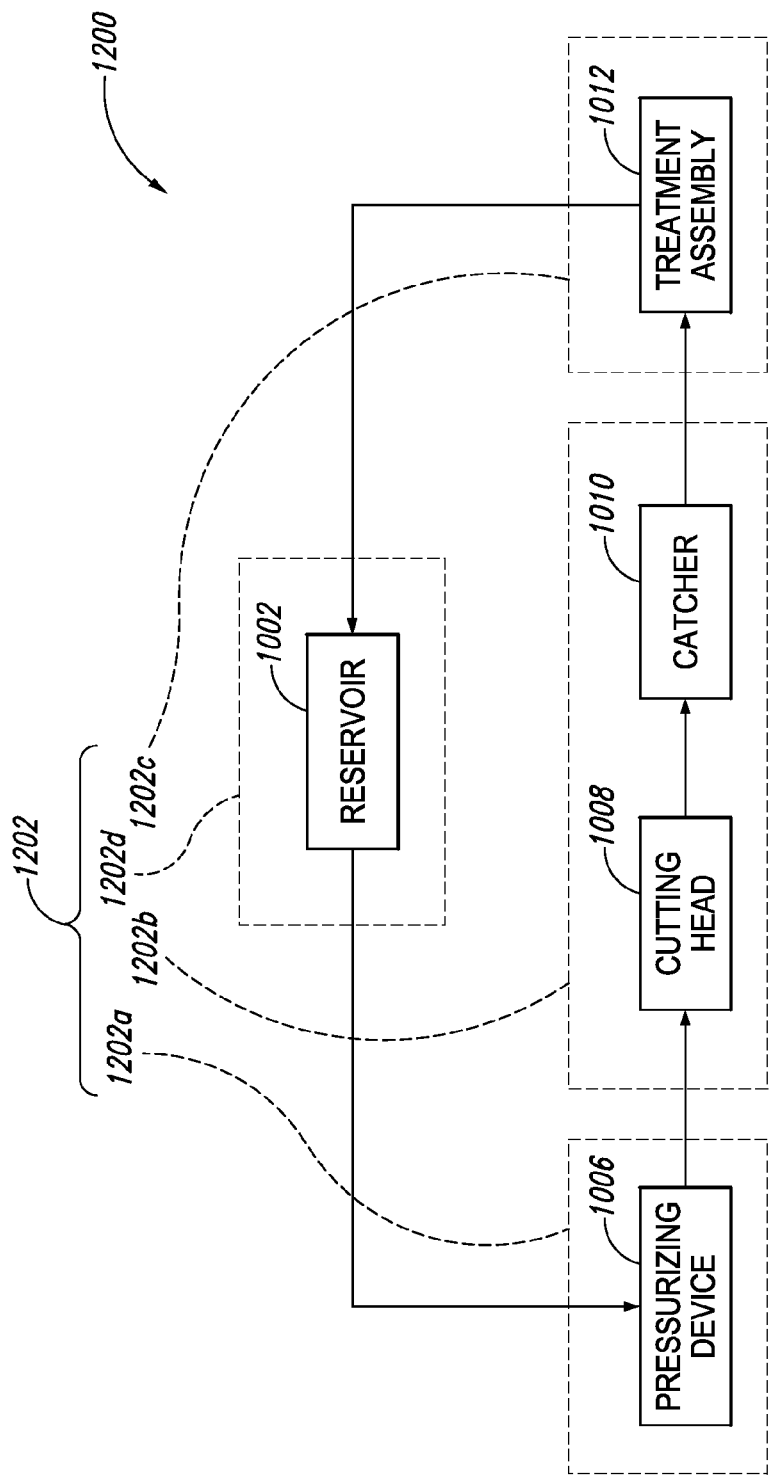
FIG. 3 is a block diagram illustrating a waterjet system in accordance with an embodiment of the present technology including a treatment assembly and having a third arrangement in which the treatment assembly is configured to treat a fluid within a fluid-recycling loop.

FIG. 3 is a block diagram illustrating a waterjet system 1200 in accordance with an embodiment of the present technology having a third arrangement in which the treatment assembly 1012 is configured to treat a fluid within a fluid-recycling loop 1202. The fluid-recycling loop 1202 can include a first portion 1202a, a second portion 1202b, a third portion 1202c, and a fourth portion 1202d, with the second, third, and fourth portions 1202b-1202d at successively further positions downstream from the first portion 1202a during a pass through the fluid-recycling loop 1202 originating at the first portion 1202a. The reservoir 1002, the pressurizing device 1006, the cutting head 1008, the catcher 1010, and the treatment assembly 1012 can be operably associated with one another (e.g., fluidically connected to one another) within the fluid-recycling loop 1202. For example, the pressurizing device 1006 can be at the first portion 1202a, the cutting head 1008 and the catcher 1010 can be at the second portion 1202b, the treatment assembly 1012 can be at the third portion 1202c, and the reservoir 1002 can be at the fourth portion 1202d of the fluid-recycling loop 1202. Other arrangements are also possible. To avoid redundancy, fluid treatment techniques and certain other aspects of the present technology may be described below primarily or entirely in the context of waterjet systems having the third arrangement. In general, however, these aspects of the present technology may also be useful in the context of waterjet systems having the first, second, and other suitable arrangements.

Figure 4:
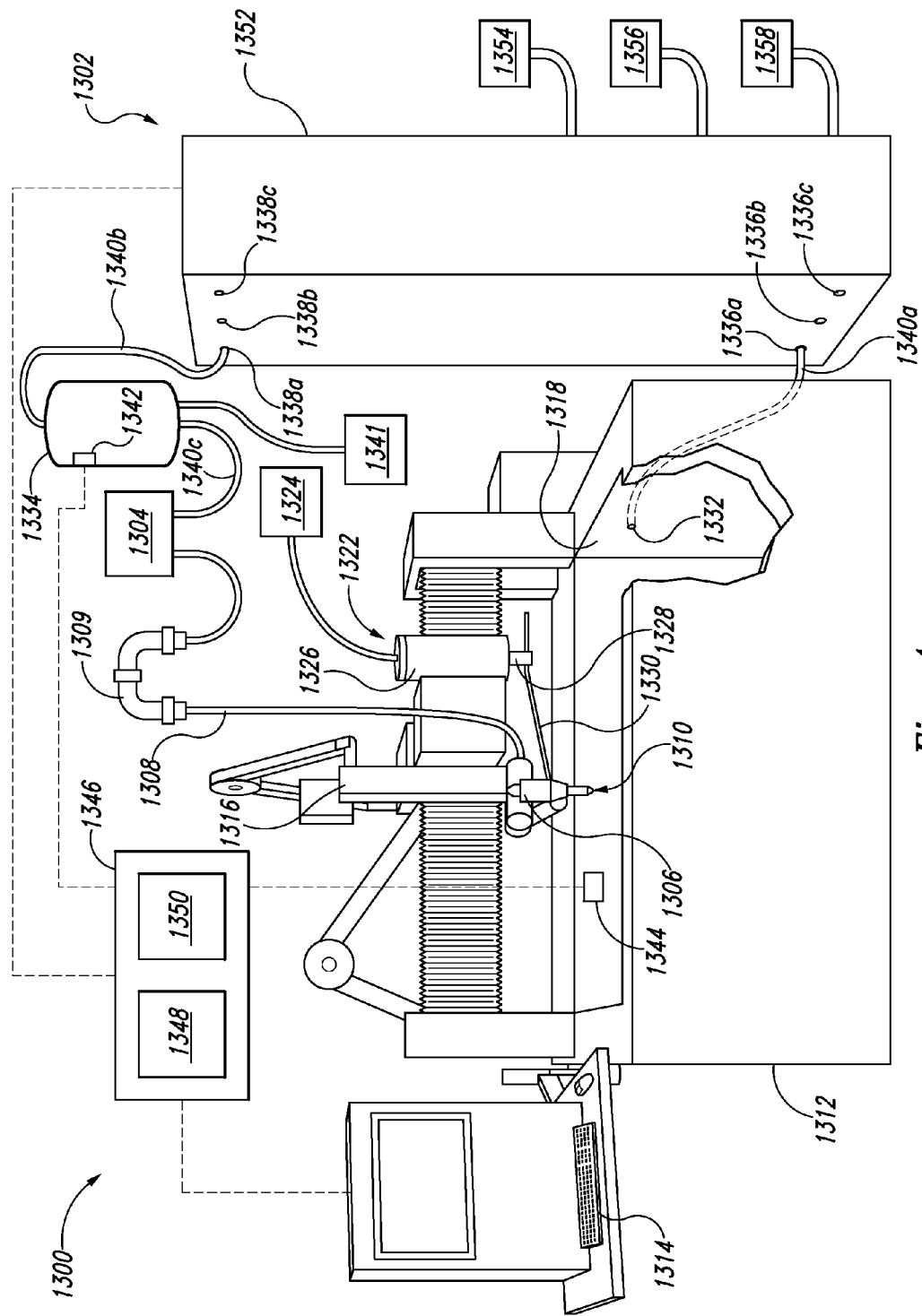
FIG. 4 is a partially schematic perspective view of a waterjet system in accordance with an embodiment of the present technology having the third arrangement shown in FIG. 3 and including a treatment assembly configured for chemical coagulation.

FIG. 4 is a partially schematic perspective view of a waterjet system 1300 in accordance with an embodiment of the present technology having the third arrangement (FIG. 3) and including a treatment assembly 1302 configured for chemical coagulation. The system 1300 can include a pressurizing device 1304 (shown schematically) (e.g., a direct-drive plunger pump or an intensifier) configured to receive a fluid moving through a fluid-recycling loop encompassing the treatment assembly 1302. The system 1300 can further include a cutting head 1306 operably connected to the pressurizing device 1304 and downstream therefrom. Extending between the pressurizing device 1304 and the cutting head 1306, the system 1300 can include an ultrahigh pressure conduit 1308. At an intermediate position along the ultrahigh pressure conduit 1308, the system 1300 can include an ultrahigh pressure joint 1309, such as an ultrahigh pressure swivel joint or another suitable ultrahigh pressure joint having two or more degrees of freedom. The pressurizing device 1304 can be configured to pressurize the fluid to an ultrahigh pressure suitable for waterjet processing. Correspondingly, the ultrahigh pressure conduit 1308, the ultrahigh pressure joint 1309, and other components of the system 1300 configured to carry the fluid between the pressurizing device 1304 and the cutting head 1306 can have pressure ratings and/or other attributes that cause these components to be compatible with an ultrahigh pressure suitable for waterjet processing.

The cutting head 1306 can include a jet outlet 1310 and can be configured to direct a jet (not shown) including the fluid toward a workpiece (also not shown) via the jet outlet 1310. The system 1300 can further include a base 1312, a user interface 1314 supported by the base 1312, and an actuator 1316 configured to move the cutting head 1306 relative to the base 1312. The base 1312 can include a catcher 1318 (e.g., an open-air tank) positioned to collect the jet in a fluid pool (not shown) after the jet passes through the workpiece. In the illustrated embodiment, the catcher 1318 is static. In other embodiments, the catcher 1318 can be replaced with a catcher configured to move with the cutting head 1306 when the system 1300 is used to process relatively large workpieces. With reference again to FIG. 4, the actuator 1316 can be configured to move the cutting head 1306 along a processing path (e.g., a cutting path) in two or three dimensions and, in some cases, to tilt the cutting head 1306 relative to the base 1312. The ultrahigh pressure joint 1309 can facilitate this movement of the cutting head 1306 relative to the base 1312.

The system 1300 can further include an abrasive-delivery apparatus 1322 configured to feed particles of abrasive material (not shown) from an abrasive material source 1324

(shown schematically) to the cutting head 1306. The abrasive-delivery apparatus 1322 can include a hopper 1326, an abrasive-metering valve 1328 downstream from the hopper 1326, and an abrasive-delivery conduit 1330 downstream from the abrasive-metering valve 1328. In some embodiments, the particles of abrasive material flow from the hopper 1326 into the abrasive-delivery conduit 1330 via the abrasive-metering valve 1328 by gravity and then flow through the abrasive-delivery conduit 1330 toward the cutting head 1306 partially or entirely in response to a Venturi effect associated with the jet. In other embodiments, the particles of abrasive material can be fed to the cutting head 1306 in another suitable manner. Within the cutting head 1306, the particles of abrasive material can accelerate with the jet before impacting the workpiece. The abrasive-delivery apparatus 1322 can be configured to move with the cutting head 1306 relative to the base 1312 or to be stationary, such as to be stationary while the cutting head 1306 moves relative to the base 1312.

As shown in the cut-away portion of FIG. 4, the catcher 1318 can include a catcher outlet 1332 through which the fluid, contaminated with pulverized abrasive material, can be drained from the fluid pool. In the illustrated embodiment, the catcher outlet 1332 extends outwardly from just below an expected fluid level within the catcher 1318 at an upper portion of a sidewall of the catcher 1318. In other embodiments, the catcher outlet 1332 can extend outwardly from a lower portion of the sidewall, from the bottom of the catcher 1318, or from another suitable portion of the catcher 1318. Positioning the catcher outlet 1332 to extend outwardly from an upper portion of the sidewall of the catcher 1318 can be useful, for example, to reduce egress of sunken particles of abrasive material and/or workpiece material from the catcher 1318 via the catcher outlet 1332. In some embodiments, these sunken particles may exit the catcher 1318 via another outlet (not shown), such as an outlet extending outwardly from the bottom of the catcher 1318. In other embodiments, these sunken particles may collect in the catcher 1318 and be removed occasionally (e.g., using a shovel or a vacuum) with or without draining the fluid pool. In still other embodiments, the catcher outlet 1332 can be positioned to encourage egress of sunken particles from the catcher 1318 along with the fluid. Furthermore, the catcher outlet 1332 can be fixed or moveable. For example, when movable, the catcher outlet 1332 can be attached to a moveable submersible pump (not shown) configured to be placed within the catcher 1318. As another example, the catcher outlet 1332, when movable, can be positioned at the end of a movable handheld collection tube (also not shown).

With reference again to FIG. 4, upstream from the pressurizing device 1304, the system 1300 can include a reservoir 1334 configured to supply the pressurizing device 1304 with the fluid. The treatment assembly 1302 can be operably connected to the catcher 1318 and to the pressurizing device 1304 and positioned therebetween within the fluid-recycling loop. For example, the treatment assembly 1302 can be configured to receive the fluid, in a contaminated state, from the catcher 1318 and to remove small colloidal particles from the fluid so as to cause the fluid to be sufficiently clarified to be supplied to the reservoir 1334 for reuse in the pressurizing device 1304. The treatment assembly 1302 can include two or more assembly-level inlets 1336 (individually identified as assembly-level inlets 1336a-1336c) and two or more assembly-level outlets 1338 (individually identified as assembly-level outlets 1338a-1338c) that can be used to connect the treatment assembly 1302 to multiple catchers and to multiple reservoirs, such as catchers and reservoirs respectively corresponding to different waterjet-processing stations within a multi-station waterjet-processing operation. Alternatively, the treatment assembly 1302 can be dedicated to a single catcher and to a single reservoir.

Connecting conduits 1340a, 1340b, 1340c (collectively identified as connecting conduits 1340) suitable for carrying the fluid can respectfully extend between the catcher outlet 1332 and the assembly-level inlet 1336a of the treatment assembly 1302, between the assembly-level outlet 1338a of the treatment assembly 1302 and the reservoir 1334, and between the reservoir 1334 and the pressurizing device 1304. The reservoir 1334, the pressurizing device 1304, the cutting head 1306, the catcher 1318, and the treatment assembly 1302, among other components of the system 1300, can be operably associated with one another (e.g., fluidically connected to one another) within the fluid-recycling loop. The system 1300 can be configured to move (e.g., to automatically move) fluid from the catcher 1318 to the treatment assembly 1302, from the treatment assembly 1302 to the reservoir 1334, from the reservoir 1334 to the pressurizing device 1304, from the pressurizing device 1304 to the cutting head 1306, and from the cutting head 1306 to the catcher 1318. The overall flow of the fluid through the fluid-recycling loop and segments of the overall flow of the fluid through the fluid-recycling loop can be intermittent or continuous at steady state. Furthermore, there can be one or more manual operations and/or breaks in the fluid-recycling loop. For example, the catcher 1318 may be configured to be drained into a holding tank (not shown) and the treatment assembly 1302 may be configured to draw the fluid from the holding tank. In some embodiments, a fluid source 1341 (shown schematically) is operably connected to the fluid-recycling loop at the reservoir 1334 for providing make-up fluid. In other embodiments, make-up fluid can be provided in another suitable manner. For example, the fluid source 1341 can be operably connected to the fluid-recycling loop at the catcher 1318, at the treatment assembly 1302, or at another suitable position within the fluid-recycling loop.

As shown in FIG. 4, the system 1300 can further include a first level sensor 1342 (shown schematically) disposed at least partially within the reservoir 1334 and configured to detect a fluid level within the reservoir 1334. Similarly, the system 1300 can include a second level sensor 1344 (shown schematically) disposed at least partially within the catcher 1318 and configured to detect a fluid level within the catcher 1318. The system 1300 can further include a controller 1346 (shown schematically) having processing circuitry 1348 (also shown schematically) and memory 1350 (also shown schematically). The controller 1346 can be operably connected to the user interface 1314, to the treatment assembly 1302, and to the first and second level sensors 1342, 1344. The memory 1350 can store instructions (e.g., non-transitory instructions) that, when executed by the controller 1346 using the processing circuitry 1348, control certain aspects of operation of the system 1300. Several example of these aspects are discussed below with reference to FIGS. 5 and 14.

In the illustrated embodiment, the treatment assembly 1302 is contained within a rectangular housing 1352 that is not fixedly connected to the base 1312. In other embodiments, the housing 1352 can be eliminated or have another suitable form. For example, at least a portion of the treatment assembly 1302 can be fixedly connected to the base 1312, to the pressurizing device 1304, or to both. Furthermore, the treatment assembly 1302 can be stationary or mobile. For example, when the treatment assembly 1302 is mobile, the housing 1352 can be replaced with a housing that includes wheels and can be readily moved to different waterjet-processing stations within a multi-station waterjet-processing operation. This can be useful, for example, to facilitate collecting fluid from different catchers within a multi-station waterjet-processing operation without necessitating the use of long collection hoses. Various other structural configurations of the treatment assembly 1302 are also possible. Furthermore, the treatment assembly 1302 can be operably connected to various combinations of support elements, such as power supplies, material supplies, and waste destinations. In the illustrated embodiment, the treatment assembly 1302 is operably connected to a coagulant supply 1354, a supplemental solute supply 1356, and a waste destination 1358, all shown schematically.

Figure 5:
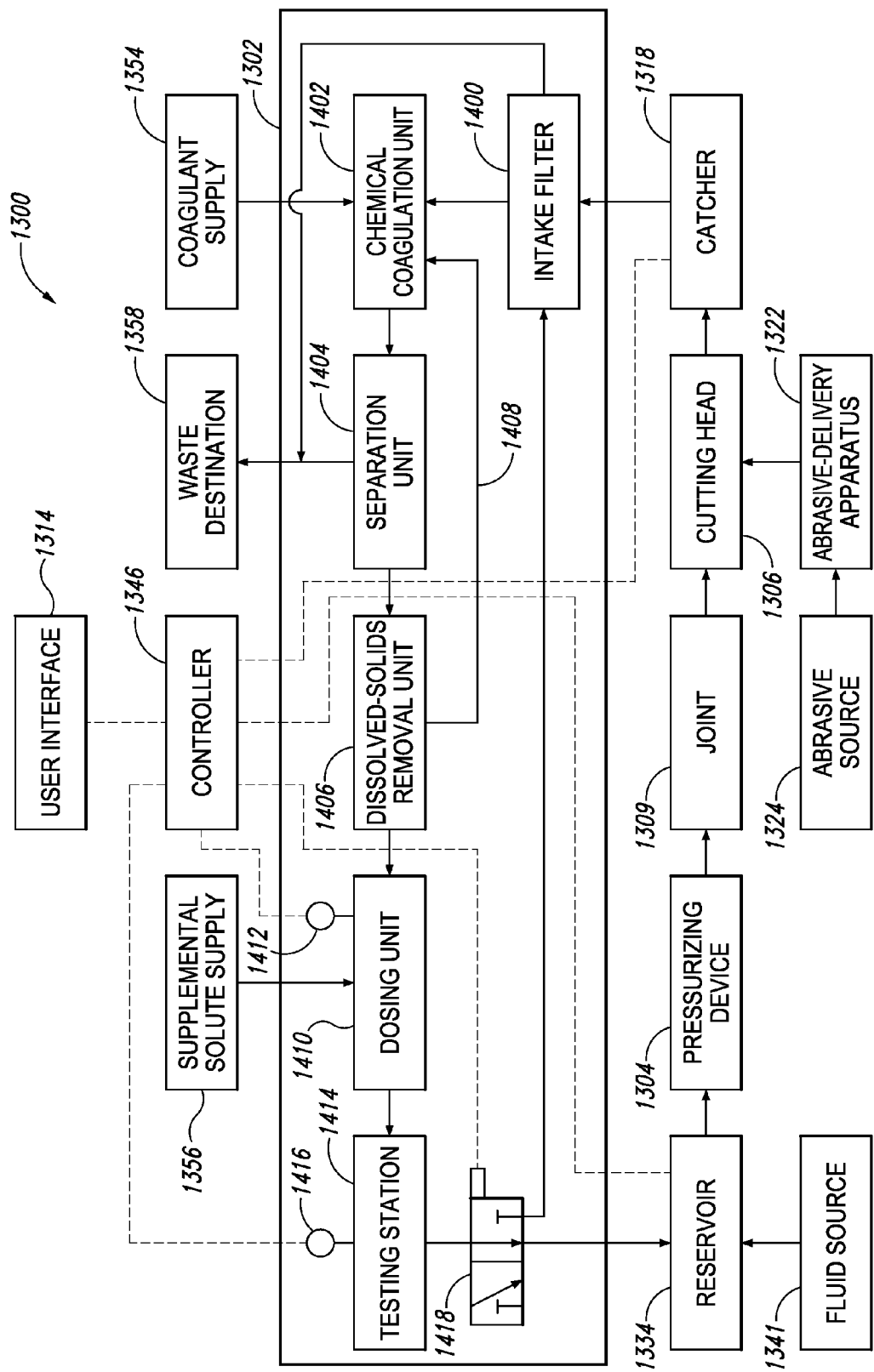
FIG. 5 is a block diagram illustrating several interconnected components of the waterjet system shown in FIG. 4.

FIG. 5 is a block diagram illustrating several interconnected components of the system 1300. For clarity of illustration, pumps and other components for conveying the fluid into, out of, and through the treatment assembly 1302 are not shown. Such components can be included in or otherwise associated with the treatment assembly 1302 as needed to achieve suitable fluid motion and containment. This is also the case for the other treatment assemblies described below with reference to FIGS. 7 and 9. As shown in FIG. 5, the treatment assembly 1302 can include an intake filter 1400 configured to remove large particles from the fluid received from the catcher 1318. In some embodiments, the intake filter 1400 is a bag filter or another suitable type of filter nominally rated for removal of at least 90% of particles larger than a relatively large threshold size (e.g., 5 microns, 50 microns, or 100 microns). The intake filter 1400 can be configured to at least generally allow passage of small colloidal particles. In other embodiments, the intake filter 1400 can have other suitable specifications. Including the intake filter 1400 in the treatment assembly 1302 can be useful, for example, to at least partially prevent relatively large particles from interfering with the operation of downstream components of the treatment assembly 1302. In addition to or instead of the intake filter 1400, the treatment assembly 1302 can include a settling weir system (not shown) serving a similar purpose. A settling weir system, for example, may be particularly useful when the treatment assembly 1302 is configured to intake all or substantially all of the contents of the catcher 1318, including sunken particles of abrasive material and/or workpiece material. Further details regarding settling weir systems are provided below with reference to FIG. 7.

Downstream from the intake filter 1400, the treatment assembly 1302 can include a chemical coagulation unit 1402 configured to chemically coagulate small colloidal particles within the fluid. The chemical coagulation unit 1402 can receive a suitable chemical coagulant from the coagulant supply 1354. Examples of suitable chemical coagulants are provided below with reference to FIG. 14. The chemical coagulation unit 1402 can include one or more mixing chambers (not shown) within which the chemical coagulant can be mixed with the fluid batchwise or continuously. For example, the chemical coagulation unit 1402 can include a first mixing chamber configured for high-speed mixing (e.g., flash mixing) and a second mixing chamber configured for lower speed mixing downstream from the first chamber. Other structural configurations of the chemical coagulation unit 1402 are also possible.

Interaction between the chemical coagulant and small colloidal particles within the fluid can cause the small colloidal particles to coagulate and eventually to form agglomerations (e.g., flocs). The treatment assembly 1302 can further include a separation unit 1404 downstream from the chemical coagulation unit 1402. The separation unit 1404 can be configured to receive the fluid from the chemical coagulation unit 1402 and to concentrate the agglomerations to form a concentrate (e.g., a sludge) and a treated (e.g., clarified) portion of the fluid. For example, the separation unit 1404 can be configured to concentrate the agglomerations primarily by filtering, gravity, centrifugation, and/or in another suitable manner. After it is separated, the concentrate can be moved from the separation unit 1404 to the waste destination 1358 for disposal (e.g., as solid waste) with or without drying. Alternatively, the concentrate can be recycled.

In some embodiments, the separation unit 1404 is configured to concentrate the agglomerations primarily by filtering using an in-stream filter, such as super-micron in-stream filter. Suitable in-stream filters include disposable super-micron bag filters, among others. Advantageously, this manner of concentrating the agglomerations may allow the treatment assembly 1302 to be relatively compact while still achieving relatively high throughput. Disadvantageously, this manner of concentrating the agglomerations may necessitate filter replacement and/or other types of maintenance. In other embodiments, the separation unit 1404 can include a settling tank defining a settling chamber configured to concentrate the agglomerations primarily by gravity. Advantageously, this manner of concentrating the agglomerations may require relatively little maintenance. Disadvantageously, this manner of concentrating the agglomerations may involve the use of relatively large fluidic components (e.g., tanks) in order to achieve acceptable throughputs. In still other embodiments, the separation unit 1404 can be configured to concentrate the agglomerations in another suitable manner using other suitable components.

As discussed below with reference to FIG. 14, it can be useful in at least some cases to use relatively high concentrations of the chemical coagulant in the chemical coagulation unit 1402. This may drive the equilibria of coagulation processes toward relatively rapid and complete conversion of small colloidal particles in the fluid into agglomerations. In these and other cases, it may be useful to remove some or all of the chemical coagulant and/or a concomitant chemical species from the fluid after the coagulation occurs. For example, some chemical coagulants, when present at high concentrations, may cause the fluid to be mildly toxic, corrosive, and/or to have other characteristics that would be undesirable within portions of the system 1300 outside of the treatment assembly 1302. Many, if not all, chemical coagulants used in the chemical coagulation unit 1402 are expected to be present in the fluid in the form of ions that contribute to the concentration of dissolved solids in the fluid. As shown in FIG. 5, the treatment assembly 1302 can include a dissolved-solids removal unit 1406 operably connected to the fluid-recycling loop downstream from the separation unit 1404. The dissolved-solids removal unit 1406 can be configured to decrease the concentration of dissolved solids in the fluid by contacting the fluid and a molecular sieve (e.g., activated carbon or a suitable zeolite), by reverse osmosis, by nanofiltration, by ion exchange, or in another suitable manner.

In some cases, the dissolved-solids removal unit 1406 separates a chemical coagulant from the fluid in a manner that allows the separated chemical coagulant to be recycled for reuse in the chemical coagulation unit 1402. For example, the dissolved-solids removal unit 1406 can be configured to decrease the concentration of dissolved solids in the fluid by reverse osmosis, nanofiltration, and/or ion exchange such that the dissolved-solids removal unit 1406 forms a concentrated solution of dissolved solids including the chemical coagulant. The treatment assembly 1302 can include a recycling conduit 1408 configured to carry the concentrated solution of dissolved solids from the dissolved-solids removal unit 1406 to the chemical coagulation unit 1402. In other cases, the dissolved-solids removal unit 1406 can separate a chemical coagulant from the fluid in a manner that does not involve recycling the separated chemical coagulant for reuse in the chemical coagulation unit 1402. For example, when the dissolved-solids removal unit 1406 is configured to decrease the concentration of dissolved solids in the fluid by contacting the fluid and a molecular sieve, a cartridge or other structure containing the molecular sieve can be configured to be replaced when it approaches saturation. The used cartridge or other structure containing the molecular sieve can then be disposed of as solid waste. Recycling a chemical coagulant can be useful, for example, when the chemical coagulant is relatively expensive, such as when the chemical coagulant includes copper and/or silver.

Some manners of reducing the concentration of dissolved solids in the fluid at the dissolved-solids removal unit 1406 may cause the fluid to become prone to leaching material from components of the system 1300 downstream from the dissolved-solids removal unit 1406. For example, reverse osmosis may tend to strip out dissolved solids that reduce this phenomenon as a side effect of reducing the concentration of the chemical coagulant in the fluid. To address this and/or other potential problems, the treatment assembly 1302 can include a dosing unit 1410 operably connected to the fluid-recycling loop downstream from the dissolved-solids removal unit 1406. The dosing unit 1410 can be configured to increase the concentration of dissolved solids in the fluid. For example, the dosing unit 1410 can be configured to draw a supplemental solute from the supplemental solute supply 1356 and add this supplemental solute to the fluid. The supplemental solute can be sodium chloride, potassium chloride, or another compound that does not tend to precipitate at ultrahigh pressures. Although the dissolved-solids removal unit 1406 and the dosing unit 1410 are separate components in the illustrated embodiment, in other embodiments the dissolved-solids removal unit 1406 and the dosing unit 1410 can be combined. For example, an ion-exchange unit can accomplish the functions of both the dissolved-solids removal unit 1406 and the dosing unit 1410 in at least some cases. In still other embodiments, one or both of the dissolved-solids removal unit 1406 and the dosing unit 1410 can be eliminated. Furthermore, the dissolved-solids removal unit 1406 can be configured to recover the chemical coagulant without removing other (e.g., smaller) ions from the fluid. For example, the dissolved-solids removal unit 1406 can include a nanofiltration membrane that blocks passage of divalent ions (e.g., $Cu^{2+}$) while allowing passage of monovalent ions.

The system 1300 can include one or more mechanisms for testing the fluid within the fluid-recycling loop. For example, the system 1300 can include a dissolved-solids sensor 1412 operably connected to the fluid-recycling loop downstream from the dissolved-solids removal unit 1406 and upstream from the pressurizing device 1304. The dissolved-solids sensor 1412 can be configured to measure an electrical property (e.g., electrical conductivity) of the fluid to determine the concentration of dissolved solids in the fluid. This measurement can be useful, for example, as input for a feedback loop that controls operation of the dosing unit 1410. The system 1300 can further include a testing station 1414 and a turbidity sensor 1416 operably connected to the fluid-recycling loop downstream from the chemical coagulation unit 1402 and upstream from the pressurizing device 1304. The turbidity sensor 1416 can be configured to measure an optical property (e.g., optical attenuation) of the fluid to determine the turbidity of the fluid, which can correspond to the concentration of small colloidal particles in the fluid. Downstream from the turbidity sensor 1416 and upstream from the pressurizing device 1304, the system 1300 can include a recirculation valve 1418 configured to divert at least a portion of the fluid back through the chemical coagulation unit 1402, such as via the intake filter 1400. Measurements from the turbidity sensor 1416 can be useful, for example, as input for a feedback loop that controls operation of the recirculation valve 1418. In the illustrated embodiment, the dissolved-solids sensor 1412 and the turbidity sensor 1416 are directly connected to the dosing unit 1410 and to the testing station 1414, respectively. In other embodiments, the dissolved-solids sensor 1412 and/or the turbidity sensor 1416 can be at other suitable positions within the fluid-recycling loop. In still other embodiments, the dissolved-solids sensor 1412 and/or the turbidity sensor 1416 can be absent.

With reference to FIGS. 4 and 5 together, the controller 1346 can be operably associated with various components of the treatment assembly 1302. For example, the controller 1346 can be operably associated with a pump (not shown) that conveys the fluid into, out of, and/or through the treatment assembly 1302. The memory 1350 can store computer-readable instructions (e.g., non-transitory instructions) that, when executed by the controller 1346 using the processing circuitry 1348, cause the controller 1346 to operate the pump so as to maintain a fluid level within the reservoir 1334 above or below a threshold level. This level can be monitored, for example using the first level sensor 1342. In addition or alternatively, the instructions, when executed by the controller 1346 using the processing circuitry 1348, can cause the controller 1346 to operate the pump so as to maintain a fluid level within the catcher 1318 above or below a threshold level. This level can be monitored, for example using the second level sensor 1344. Furthermore, the controller 1346 can be operably associated with the dissolved-solids sensor 1412 and with the dosing unit 1410. The instructions, when executed by the controller 1346 using the processing circuitry 1348, can cause the controller 1346 to operate the dosing unit 1410 so as to increase the concentration of dissolved solids in the fluid in response to an indication from the dissolved-solids sensor 1412 that the concentration of dissolved solids in the fluid is below a threshold. In this way, for example, the controller 1346 can at least partially prevent the fluid from reaching the pressurizing device 1304 with an unacceptably low concentration of dissolved solids. Similarly, the controller 1346 can be operably associated with the turbidity sensor 1416 and with the recirculation valve 1418. The instructions, when executed by the controller 1346 using the processing circuitry 1348, can cause the controller 1346 to operate the recirculation valve 1418 so as to divert the fluid from a course through the fluid-recycling loop in response to an indication from the turbidity sensor 1416 that the turbidity of the fluid is above a threshold. In this way, for example, the controller 1346 can at least partially prevent the fluid from reaching the pressurizing device 1304 with an unacceptably high concentration of small colloidal particles.

Figure 6:
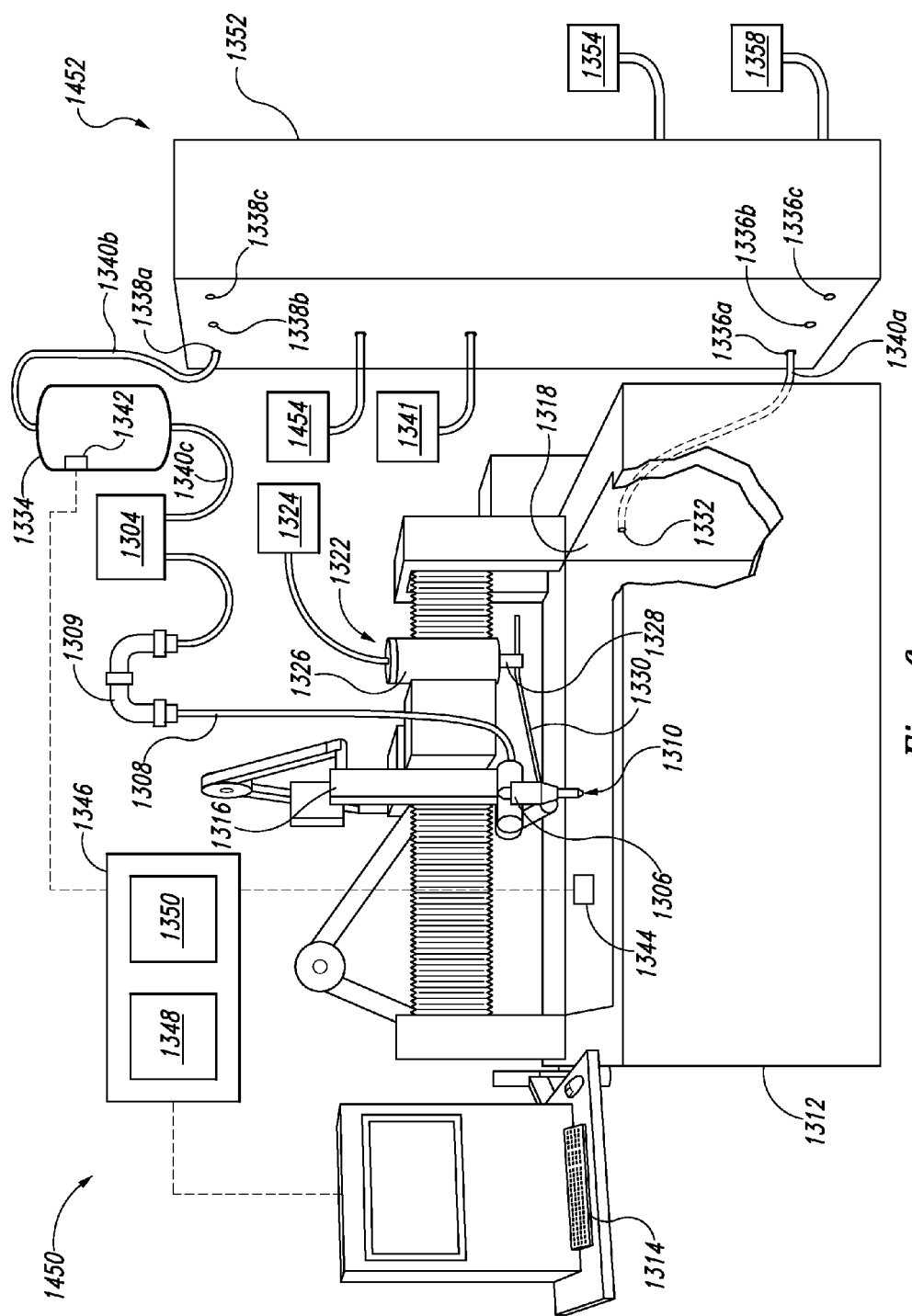
FIG. 6 is a partially schematic perspective view of a waterjet system in accordance with an embodiment of the present technology having the third arrangement shown in FIG. 3 and including a different treatment assembly configured for chemical coagulation.
Figure 7:
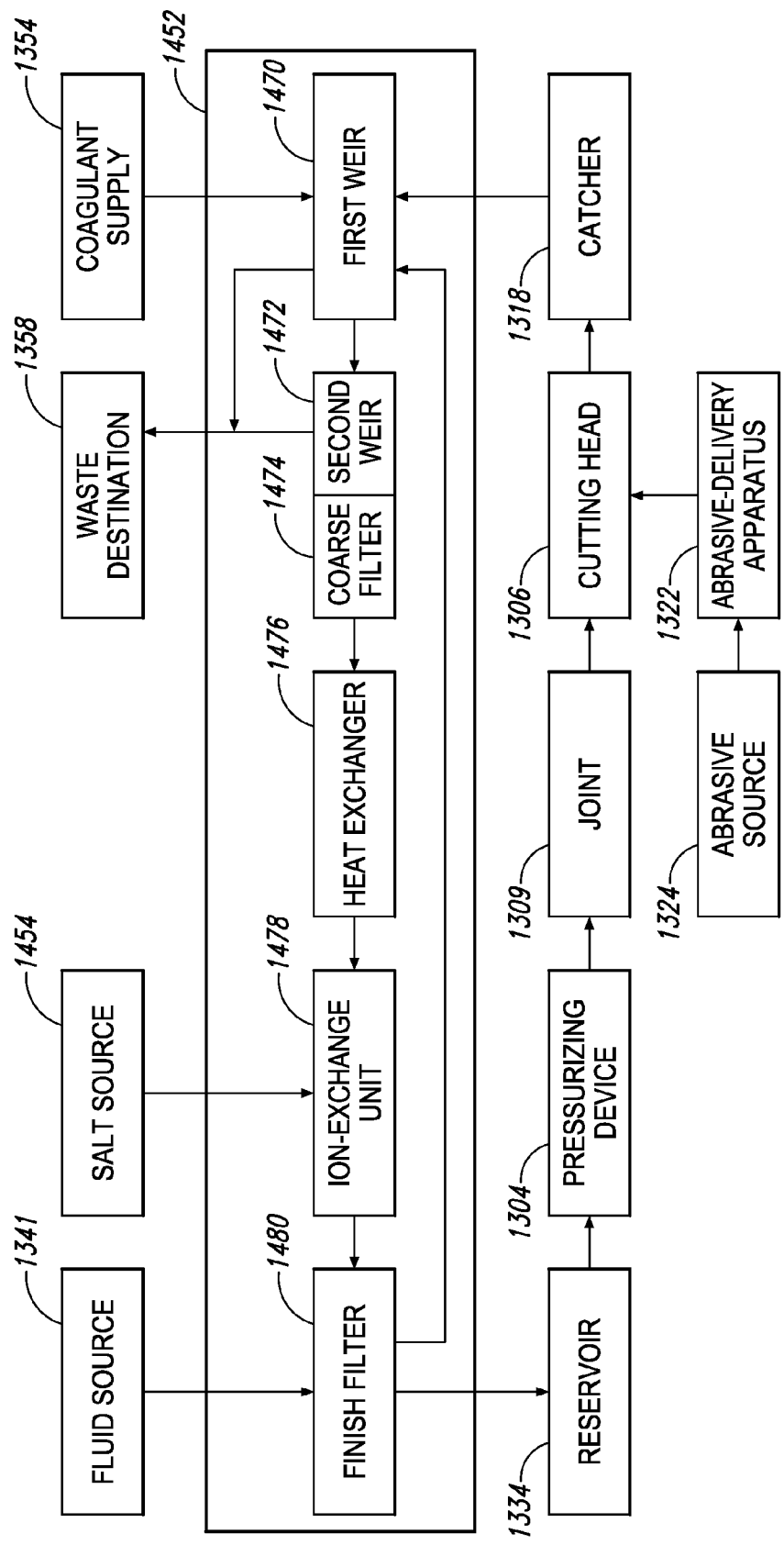
FIG. 7 is a block diagram illustrating several interconnected components of the waterjet system shown in FIG. 6.

FIG. 6 is a partially schematic perspective view of a waterjet system 1450 in accordance with an embodiment of the present technology having the third arrangement (FIG. 3) and including a treatment assembly 1452 again configured for chemical coagulation. The system 1450 can be generally similar to the system 1300 shown in FIG. 4. As shown in FIG. 6, the treatment assembly 1452 can be operably connected to a combination of support elements different than the combination of support elements to which the treatment assembly 1302 of the system 1300 shown in FIG. 4 is connected. In particular, the treatment assembly 1452 can be operably connected to the fluid source 1341, the coagulant supply 1354, the waste destination 1358, and a regenerant source 1454, all shown schematically. FIG. 7 is a block diagram illustrating several interconnected components of the system 1450.

In the illustrated embodiment, the treatment assembly 1452 includes a first weir 1470 positioned to receive fluid from the catcher 1318. The treatment assembly 1452 also includes a second weir 1472 downstream from the first weir 1470. In other embodiments, the first and second weirs 1470, 1472 can be combined into a single weir, divided into more than two weirs, located outside the housing 1352 (e.g., as one or more stand-alone units), or have other suitable configurations. The first and second weirs 1470, 1472 can include a series of obstructions (not shown) (e.g., dams or sluices) that help to trap any particles within the fluid that are capable of settling in response to gravity. In at least some cases, the fluid is agitated as it flows through the first and second weirs 1470, 1472. For example, the first and second weirs 1470, 1472 can include shakers (not shown) configured to shake (e.g., vibrate) surfaces (also not shown) over which the fluid flows as it moves through the first and second weirs 1470, 1472.

As the fluid enters the first weir 1470 (or at another suitable location), chemical coagulant from the coagulant supply 1354 can be added to the fluid. Again, examples of suitable chemical coagulants are provided below with reference to FIG. 14. As the fluid travels through the first and second weirs 1470, 1472, the chemical coagulant can become increasingly well mixed into the fluid and can cause small colloidal particles within the fluid to coagulate and eventually to form agglomerations (e.g., flocs). In addition to facilitating this mixing, the first and second weirs 1470, 1472 can facilitate concentrating the agglomerations to form a concentrate (e.g., a sludge), thereby leaving a treated (e.g., clarified) portion of the fluid. Thus, in at least some cases, the functionality of the first and second weirs 1470, 1472 is similar to collective functionality of the chemical coagulation unit 1402 and the separation unit 1404 of the treatment assembly 1302 shown in FIG. 5. After it is formed, the concentrate can be moved from the first and second weirs 1470, 1472 to the waste destination 1358 for disposal (e.g., as solid waste) with or without drying. Alternatively, the concentrate can be recycled.

The treatment assembly 1452 can further include a coarse filter 1474 operably connected to the second weir 1472, such as appended to an outlet of the second weir 1472. The coarse filter 1474 can be configured to remove from the fluid any agglomerations not removed by the first and second weirs 1470, 1472 or other large particles present in the fluid as the fluid exits the second weir 1472. In at least some cases, the coarse filter 1474 has specifications the same as or similar to those of the intake filter 1400 of the treatment assembly 1302 shown in FIG. 5. At successively further positions downstream from the coarse filter 1474, the treatment assembly 1452 can include a heat exchanger 1476 (e.g., a chiller), an ion-exchange unit 1478, and a finish filter 1480. In many cases, the fluid exiting the coarse filter 1474 is relatively hot, such as greater than 50° C. The heat exchanger 1476 can be used to cool the fluid to a temperature suitable for further processing. The ion-exchange unit 1478 can be used to reduce undesirable hardness in the fluid, to remove dissolved solids remaining from the chemical coagulant (e.g., similar to the dissolved-solids removal unit 1406 of the treatment assembly 1302 shown in FIG. 5), and/or for another suitable purpose. The regenerant source 1454 can supply a suitable salt (e.g., sodium chloride) to the ion-exchange unit 1478 so as to occasionally regenerate an ion-exchange resin within the ion-exchange unit 1478.

As shown in FIG. 7, the fluid that exits the ion-exchange unit 1478 can be supplemented with make-up fluid from the fluid source 1341 and fed to the finish filter 1480. In at least some embodiments, the finish filter 1480 is a nanofilter or relatively large-pore reverse-osmosis filter. For example, the finish filter 1480 can have an average sieve diameter within a range from 0.001 to 0.005 microns. When removing the chemical coagulant from the fluid is not necessary, the finish filter 1480 can have an average sieve diameter that allows passage of the chemical coagulant, but blocks passage of slightly larger constituents of the fluid. When removing the chemical coagulant from the fluid is desirable, the finish filter 1480 can have an average sieve diameter that blocks passage of the chemical coagulant, but allows passage of sodium and other monovalent ions. Concentrate from the finish filter 1480 can be routed to the first weir 1470 for further processing. In general, the fluid entering the finish filter 1480 is expected to be relatively free of small colloidal particles. Thus, the finish filter 1480 is expected to foul infrequently. From the finish filter 1480, the fluid can flow into the reservoir 1334 to await pressurization. In at least some cases, use of the finish filter 1480 may reduce or eliminate the need for frequent turbidity testing of the fluid entering the reservoir 1334.

Figure 8:
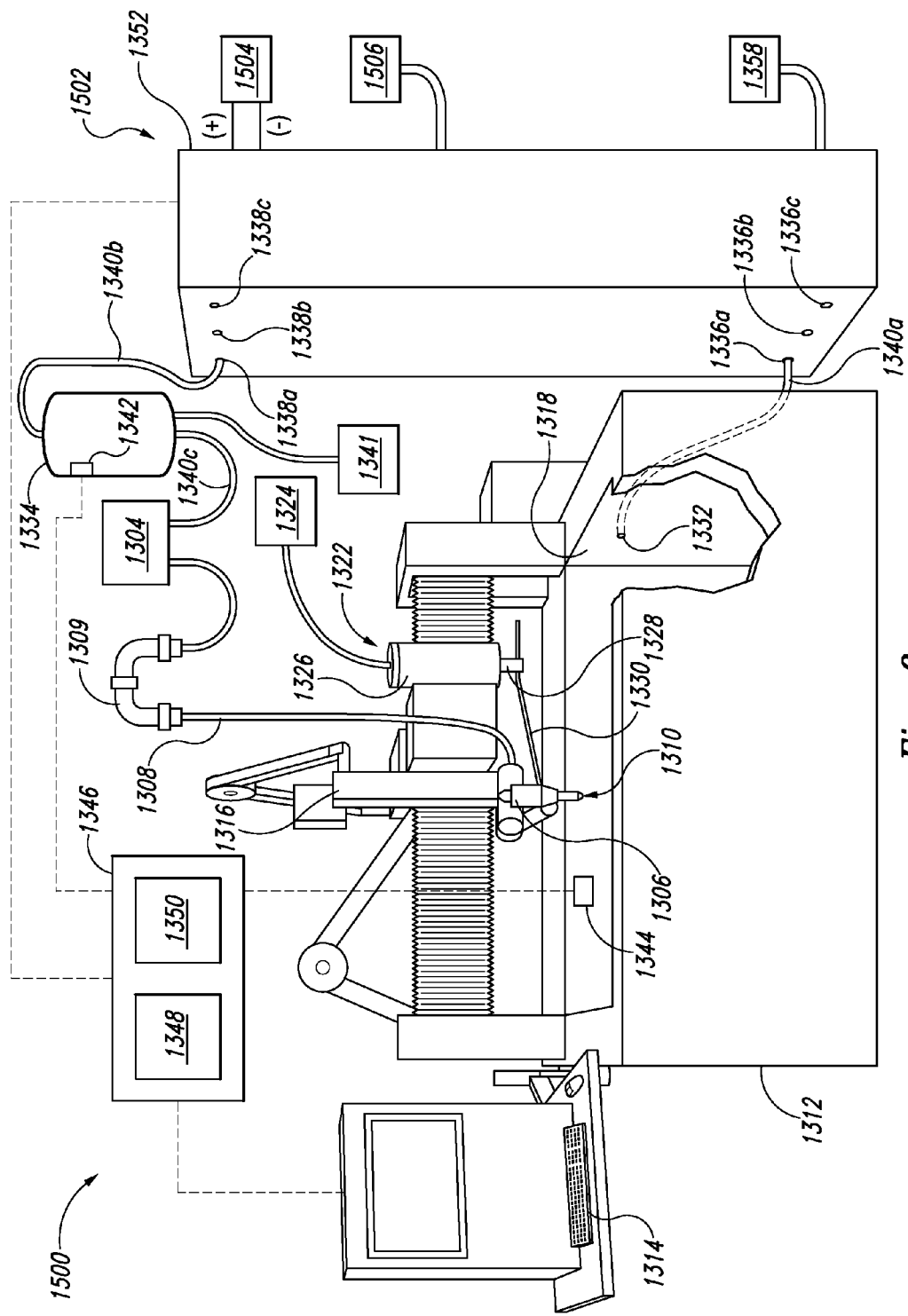
FIG. 8 is a partially schematic perspective view of a waterjet system in accordance with an embodiment of the present technology having the third arrangement shown in FIG. 3 and including a treatment assembly configured for electrocoagulation.
Figure 9:
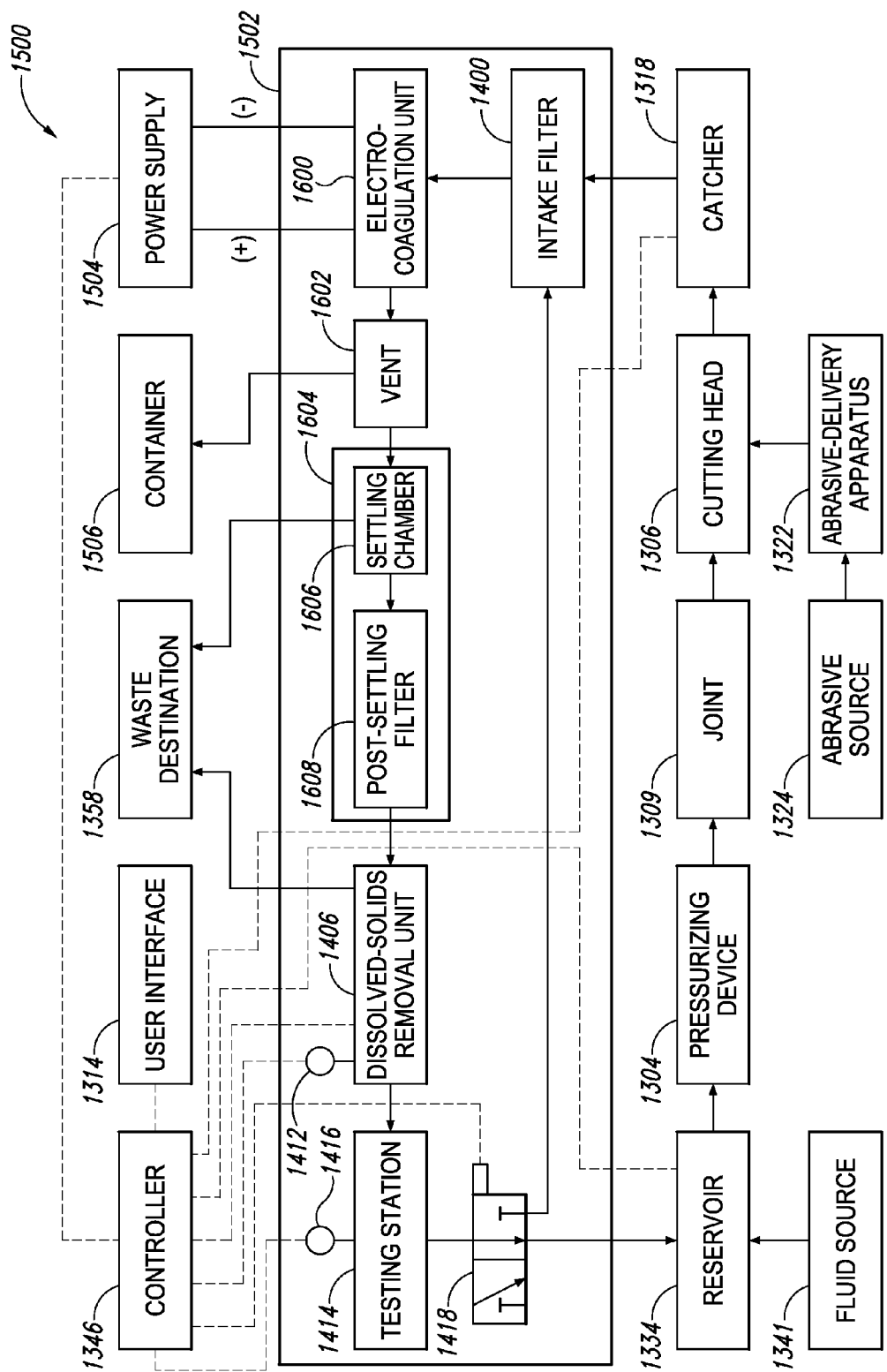
FIG. 9 is a block diagram illustrating several interconnected components of the waterjet system shown in FIG. 8.

FIG. 8 is a partially schematic perspective view of a waterjet system 1500 in accordance with an embodiment of the present technology having the third arrangement (FIG. 3) and including a treatment assembly 1502 configured for electrocoagulation. The system 1500 can be generally similar to the system 1300 shown in FIG. 4. As shown in FIG. 8, the treatment assembly 1502 can be operably connected to a combination of support elements different than the combination of support elements to which the treatment assembly 1302 of the system 1300 shown in FIG. 4 is connected. In particular, the treatment assembly 1502 can be operably connected to a power supply 1504, a container 1506, and the waste destination 1358, all shown schematically. FIG. 9 is a block diagram illustrating several interconnected components of the system 1500. As with the treatment assembly 1302 of the system 1300 shown in FIG. 4, the treatment assembly 1502 can include the intake filter 1400, the dissolved-solids removal unit 1406, the dissolved-solids sensor 1412, the testing station 1414, the turbidity sensor 1416, and the recirculation valve 1418.

Downstream from the intake filter 1400 and operably connected to the power supply 1504, the treatment assembly 1502 can include an electrocoagulation unit 1600 configured to electrocoagulate small colloidal particles within the fluid. The power supply 1504 can be configured to supply electrical power to electrodes (not shown in FIGS. 8 and 9) within the electrocoagulation unit 1600. The controller 1346 can be operably associated with the power supply 1504 to control operation of the electrocoagulation unit 1600. The electrocoagulation unit 1600 and the power supply 1504 are discussed in further detail below with reference to FIG. 10. While the fluid passes through the electrocoagulation unit 1600, small colloidal particles within the fluid can begin to coagulate. One or more reactions that occur within the electrocoagulation unit 1600 may generate gas (e.g., hydrogen gas) that forms bubbles within the fluid. Downstream from the electrocoagulation unit 1600, the treatment assembly 1502 can include a vent 1602 configured to allow this gas to exit the fluid. The vent 1602, for example, can be a port that discharges to the atmosphere or, as shown in the illustrated embodiment, a port that discharges to the container 1506.

After passing through the vent 1602, the fluid can travel into a separation unit 1604 configured to separate coagulated small colloidal particles from the fluid into a concentrate (e.g., a sludge). In the illustrated embodiment, the separation unit 1604 includes a settling chamber 1606 and a post-settling filter 1608 downstream from the settling chamber 1606. Within the settling chamber 1606, the coagulated small colloidal particles within the fluid can coalesce into agglomerations (e.g., flocs) and eventually sink to form the concentrate. As described below with reference to FIG. 11, the concentrate can be collected from a lower portion of the settling chamber 1606 after it settles. The post-settling filter 1608 can be useful to reduce or eliminate egress of stray agglomerations that do not settle within the settling chamber 1606. In some embodiments, the post-settling filter 1608 is nominally rated for removal of at least 90% of particles larger than a suitable threshold size (e.g., 0.5 micron, 0.75 micron, or 1 micron). For example, the post-settling filter 1608 can be configured to remove all or substantially all agglomerations larger than the threshold size from the fluid. In other embodiments, the post-settling filter 1608 can have other suitable specifications.

Although passing through the treatment assembly 1502 once is not expected to cause a significant increase in the concentration of dissolved solids in the fluid, multiple passes through the treatment assembly 1502 may have a cumulative effect that increases the concentration of dissolved solids in the fluid to an unacceptably high level. As discussed above, high concentrations of dissolved solids can cause undesirable precipitation of solids at ultrahigh pressures. To address this problem, the treatment assembly 1502 can include the dissolved-solids removal unit 1406 downstream from the separation unit 1604. In general, the degree to which electrocoagulation increases the concentration of dissolved solids in the fluid may be less than the degree to which chemical coagulation increases the concentration of dissolved solids in the fluid. Thus, it is expected that only limited removal of dissolved solids by the dissolved-solids removal unit 1406 may be needed. In fact, in some cases, the dissolved-solids removal unit 1406 can be eliminated without significantly undermining performance of the system 1500. In other cases, the dissolved-solids removal unit 1406 can be configured to treat only a portion of the fluid flowing through the fluid-recycling loop.

In the illustrated embodiment, the dissolved-solids removal unit 1406 is positioned in-line with a primary flowpath through the fluid-recycling loop. In other embodiments, the dissolved-solids removal unit 1406 can be positioned along a branch of the fluid-recycling loop separate from the primary flowpath. For example, the system 1500 can include a diverter (not shown) configured to route a portion of the fluid through the dissolved-solids removal unit 1406 while a remaining portion of the fluid bypasses the dissolved-solids removal unit 1406. The controller 1346 can be operably associated with the diverter. In this case, the memory 1350 can store instructions that, when executed by the controller 1346 using the processing circuitry 1348, cause the controller 1346 to operate the diverter so as to control the relative amount of the fluid routed through the dissolved-solids removal unit 1406. Alternatively or in addition, the dissolved-solids removal unit 1406 can be duty cycled or otherwise controlled so as to remove only a portion of the dissolved solids in the fluid flowing through the primary flowpath or a branch thereof. In this case, the memory 1350 can store instructions that, when executed by the controller 1346 using the processing circuitry 1348, cause the controller 1346 to operate the dissolved-solids removal unit 1406 so as to maintain a concentration of dissolved solids in the fluid within a predetermined range.

FIG. 10 is a cross-sectional profile view of the electrocoagulation unit 1600 of the treatment assembly 1502. The electrocoagulation unit 1600 can include a housing 1700 and an electrocoagulation chamber 1702 within the housing 1700. The electrocoagulation unit 1600 can further include one or more first electrodes 1704 (individually identified as first electrodes 1704*a-d*) and one or more second electrodes 1706 (individually identified as second electrodes 1706*a-c*) alternatingly disposed within the electrocoagulation chamber 1702. The individual first electrodes 1704 and adjacent individual second electrodes 1706 can form electrode pairs individually defining upwardly extending flowpaths 1708 (individually identified as flowpaths 1708*a-f*) therebetween. The first and second electrodes 1704, 1706 can be operably connected to opposite terminals of the power supply 1504 and configured to be electrically charged with opposite polarities at any given time. In some embodiments, the power supply 1504 is configured to deliver direct current (e.g., at 36 volts and 30 amps or another suitable level) with or without polarity switching. In other embodiments, the power supply 1504 is configured to deliver alternating current. In response to the applied charge, adjacent first and second electrodes 1704, 1706 can undergo an electrolysis reaction that generates ions and, in at least some cases, electrolysis products within the fluid as it flows through the flowpaths 1708. Different electrode materials can be used to cause different reactions, which may tend to promote coagulation of different types of small colloidal particles. The materials of the first and second electrodes 1704, 1706 can be the same or different. In one example, the first and second electrodes 1704, 1706 are made primarily or entirely of aluminum. In another example, the first and second electrodes 1704, 1706 are made primarily or entirely of mild steel. Other materials and combinations are also possible.

The first and second electrodes 1704, 1706 can be shaped to have large surface areas in contact with the flowpaths 1708. For example, the first and second electrodes 1704, 1706 can be shaped as flat or non-flat (e.g., ridged) plates. The thickness of such plates can be, for example, from 0.15 centimeter to 0.45 centimeter, such as about 0.32 centimeter. Spacing between adjacent first and second electrodes 1704, 1706 can be, for example, from 2 cm to 10 cm, such as about 5 centimeters. The electrocoagulation unit 1600 can be configured to allow the first and second electrodes 1704, 1706 to be replaced conveniently. Replacement of the first and second electrodes 1704, 1706 can occur, for example, after the electrocoagulation unit 1600 operates for a certain amount of time. The first and second electrodes 1704, 1706 can also be replaced to change the electrocoagulation reactions so as to better suit the characteristics of a fluid being treated. For example, when the system 1300 is used to process different types of materials and/or used with different types of abrasive materials, different types of small colloidal particles may be generated. When fluid containing these particles is treated, the first and second electrodes 1704, 1706 can be selected to be of a material type that causes an electrolytic reaction well suited for coagulating the type of small colloidal particles being generated.

The electrocoagulation unit 1600 can include an inlet manifold 1710 extending through a series of holes 1714 (one identified in FIG. 3) in lower portions of the first and second electrodes 1704, 1706. The inlet manifold 1710 can include a series of laterally distributed openings 1716 (one identified in FIG. 3) and an end cap 1712 and can be configured to distribute fluid through the openings 1716 as the fluid enters the electrocoagulation chamber 1702. This can cause relatively equal portions of the fluid to be routed along the respective flowpaths 1708. To avoid creating short circuits, the inlet manifold 1710 and any support structures (e.g., spacers, clamps, etc.) (not shown) in contact with the first and second electrodes 1704, 1706 can be electrically non-conductive or otherwise electrically isolated from the first and second electrodes 1704, 1706 and from the flowpaths 1708. Below the inlet manifold 1710, a lower portion of the electrocoagulation chamber 1702 can be tapered with a horizontal cross-sectional area that decreases toward a first concentrate outlet 1718 of the separation unit 1604. Depending on operation of the electrocoagulation unit 1600, some concentrate may collect in the lower portion of the electrocoagulation chamber 1702. This concentrate can be removed from the electrocoagulation unit 1600 continuously or non-continuously (e.g., periodically).

In the illustrated embodiment, the first and second electrodes 1704, 1706 and the flowpaths 1708 are vertically oriented and the electrocoagulation unit 1600 includes a first fluid outlet 1720 extending from an upper portion of the electrocoagulation chamber 1702. In other embodiments, the first and second electrodes 1704, 1706 and the flowpaths 1708 can be diagonally oriented, or have other suitable orientations and/or the first fluid outlet 1720 can have other suitable positions. Flowing the fluid upward during electrocoagulation may increase the overall percentage of small colloidal particles in fluid entering the electrocoagulation unit 1600 that are adequately coagulated by the time the fluid exits the electrocoagulation unit 1600. For example, the fluid may flow upward at a steady-state flowrate that tends to cause large agglomerations of electrocoagulated small colloidal particles to remain suspended within the flowpaths 1708 for prolonged periods of time. While suspended, these agglomerations may serve as effective collectors of additional small colloidal particles. Forces acting on the suspended agglomerations include drag from the flowing fluid, gravity, and buoyancy from bubbles of gas that may form during electrocoagulation and become attached to surfaces of the agglomerations over time. These forces may change over time as the agglomerations increase in size and accumulate more surface bubbles. Given the balance of these forces, the steady-state flowrate of the fluid through the electrocoagulation unit 1600, the height of the flowpaths 1708, and/or other factors can be selected to cause the agglomerations to remain suspended for as long as possible. The heights of the flowpaths 1708 can be for example, from 130 centimeters to 230 centimeters, such as about 182 centimeters. The individual first and second electrodes 1704, 1706 and/or the electrocoagulation chamber 1702 can have greater heights than widths. For example, the individual first and second electrodes 1704, 1706 and/or the electrocoagulation chamber 1702 can have heights from 4 times to 14 times their widths, such as about 9 times their widths. After being suspended, the agglomerations can settle to form concentrate or exit the electrocoagulation unit 1600 with the fluid via the first fluid outlet 1720.

FIG. 11 is a partially cross-sectional profile view of the separation unit 1604 of the treatment assembly 1502. In the illustrated embodiment, the vent 1602 is a tee junction with a first branch 1800 that extends upward for venting gas and a second branch 1802 that extends downward for carrying the fluid. In other embodiments, the vent 1602 can have another suitable form. Downstream from the vent 1602, the treatment assembly 1502 can include a fluid-delivery conduit 1804 extending downward toward a fluid inlet 1806 of the settling chamber 1606. The fluid-delivery conduit 1804 can be at least partially serpentine. This can increase the length of the passage through which the fluid flows and increase turbulence in the fluid, both of which may tend to increase the degree to which gas bubbles are eliminated from the fluid. Alternatively, the fluid-delivery conduit 1804 can be straight or have another suitable shape. The fluid inlet 1806 can open into a lower portion of the settling chamber 1606. Similar to the lower portion of the electrocoagulation chamber 1702 (FIG. 10), the lower portion of the settling chamber 1606 can be tapered with a horizontal cross-sectional area that decreases toward a second concentrate outlet 1810 extending from the lower portion of the settling chamber 1606. Operably connected to the second concentrate outlet 1810, the treatment assembly 1502 can include a concentrate-removal element 1812 having a concentrate-removal valve 1814 and a concentrate-removal port 1816 downstream from the concentrate-removal valve 1814. The concentrate-removal valve 1814 can be configured to open and close a fluidic connection between the concentrate-removal port 1816 and the second concentrate outlet 1810 and/or to otherwise control a flowrate of concentrate through the second concentrate outlet 1810.

As shown in FIG. 11, the settling chamber 1606 can contain a concentrate-to-clarified-fluid interface 1822. Extending from an upper portion of the settling chamber 1606, the separation unit 1604 can include a second fluid outlet 1824 configured to allow the fluid, in a clarified state, to exit the settling chamber 1606 above the interface 1822. When the fluid is introduced into the settling chamber 1606 below the interface 1822, it is expected to migrate upward through a settled volume of concentrate toward the second fluid outlet 1824. In this way, remaining uncoagulated small colloidal particles within the fluid may tend to become incorporated into and remain with the settled volume of concentrate, thereby further increasing the percentage of small colloidal particles removed from the fluid during treatment. Any gas bubbles that enter the settling chamber 1606 with the fluid may undesirably tend to carry concentrate from the settled volume of concentrate upward toward the second fluid outlet 1824. Separating these bubbles from the fluid as it flows through the fluid-delivery conduit 1804 and venting the gas that forms the bubbles via the vent 1602 can reduce or eliminate this problem. In at least some cases, the fluid, in a clarified state, is discharged from the settling chamber 1606 without a filter to hold back concentrate.

With reference to FIGS. 8 and 11 together, the system 1500 can include a third level sensor 1826 disposed at least partially within the settling chamber 1606 and configured to detect the level of the interface 1822. The third level sensor 1826 and the concentrate-removal valve 1814 can be operably associated with the controller 1346. The memory 1350 can store instructions that, when executed by the controller 1346 using its processing circuitry 1348, cause the controller 1346 to operate the concentrate-removal valve 1814 so as to maintain the interface 1822 above the fluid inlet 1806 and below the second fluid outlet 1824. Alternatively or in addition, the level of the interface 1822 can be monitored and maintained by operating the concentrate-removal valve 1814 manually. The concentrate-removal element 1812 can be configured to allow the concentrate to be fluidically separated from the settling chamber 1606 before being subjected to further processing. For example, the concentrate-removal element 1812 can be configured to allow the concentrate to be fluidically separated from the settling chamber 1606 without filtering. In some embodiments, the concentrate-removal port 1816 includes an appendix 1828 configured to collect concentrate when the concentrate-removal valve 1814 is opened and to be removed from the concentrate-removal element 1812 after the concentrate-removal valve 1814 is closed. Once removed from the concentrate-removal element 1812, the appendix 1828 can be used to transport the concentrate to a drying tray 1830 where the concentrate can be dried before disposal. In other embodiments, the concentrate-removal element 1812 can be configured to allow the concentrate to be removed in another suitable manner.

Selected Examples of Methods for Operating Waterjet Systems

Figures 12, 13:
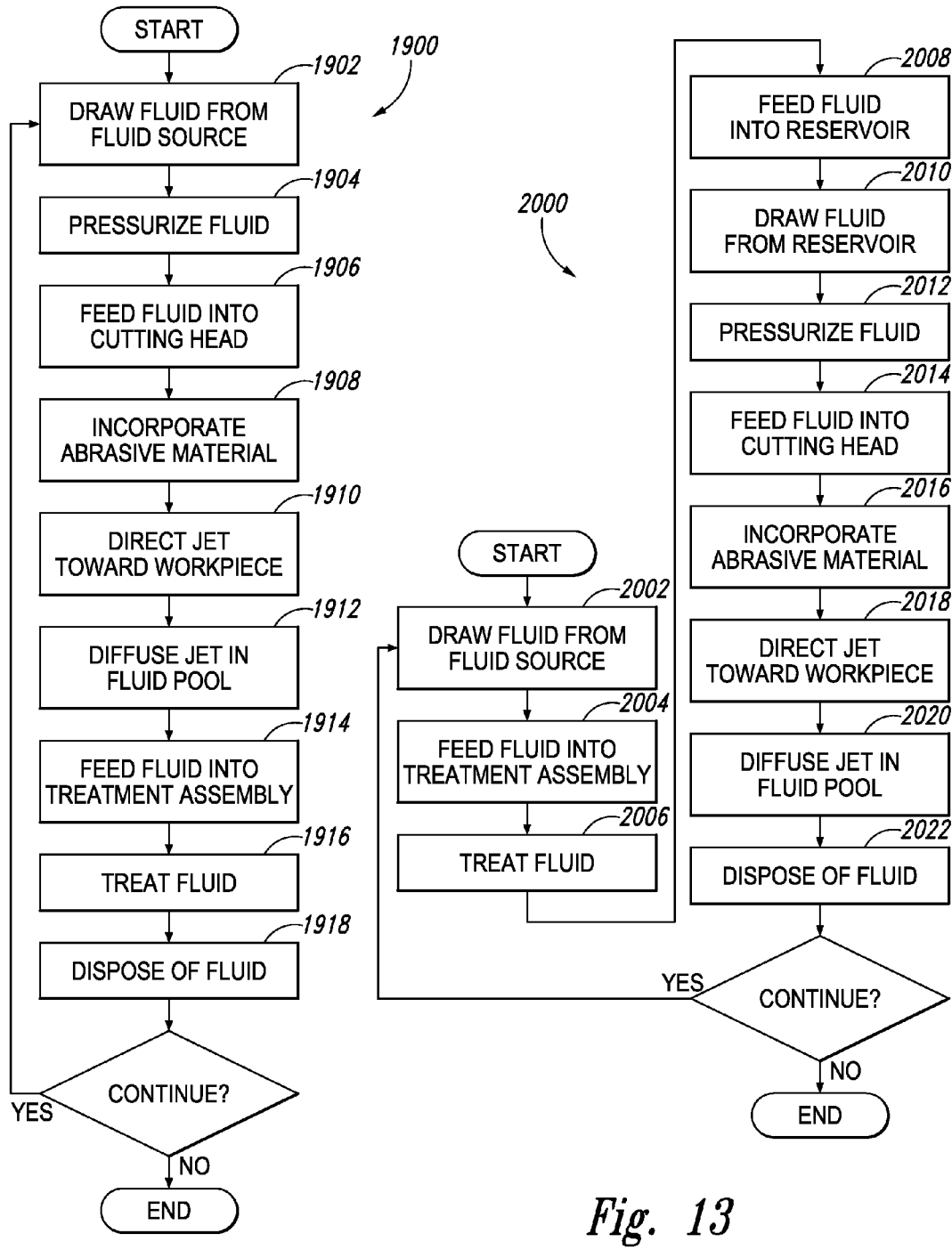
FIG. 12 is a flow chart illustrating a method for operating the waterjet system shown in FIG. 1 in accordance with an embodiment of the present technology.
FIG. 13 is a flow chart illustrating a method for operating the waterjet system shown in FIG. 2 in accordance with an embodiment of the present technology.

FIG. 12 is a flow chart illustrating a method 1900 for operating the waterjet system 1000 shown in FIG. 1 in accordance with an embodiment of the present technology. With reference to FIGS. 1 and 12 together, the method 1900 can include drawing fluid from the fluid source 1004 (block 1902) into the reservoir 1002 and then into the pressurizing device 1006. Next, the method 1900 can include pressurizing the fluid (block 1904) to a pressure suitable for waterjet processing using the pressurizing device 1006. In at least some cases, the pressurizing device 1006 is not a direct-drive plunger pump in the context of the method 1900. The fluid can then be fed into the cutting head 1008 (block 1906) and used to form a jet, such as by passing the fluid through a suitable orifice. Particles of abrasive material (e.g., garnet) can be incorporated into the jet (block 1908) and the jet can be directed toward a workpiece (block 1910). After impacting the workpiece, the jet can diffuse into a fluid pool within the catcher 1010 (block 1912).

Impacting the workpiece and/or the fluid pool can cause the particles of abrasive material within the jet to break apart into small fragments that then disperse within the fluid pool as small colloidal particles. The level of fluid within the fluid pool can be monitored and, if the level is above a threshold level, fluid from the fluid pool can be fed into the treatment assembly 1012 (block 1914). Within the treatment assembly 1012, the fluid can be treated (block 1916), such as by one of the methods described below with reference to FIGS. 14-16. Before being treated, the fluid may be unsuitable for disposal. For example, the fluid may have a characteristic, such as general characteristic (e.g., turbidity) and/or a specific characteristic (e.g., a concentration of a specific substance), that falls outside a specification for acceptable discharges into a municipal sewage system. Treating the fluid can change this characteristic so that the fluid falls inside the specification. After the fluid is treated, the method 1900 can include disposing of the fluid (block 1918), such as by routing the fluid to the waste destination 1014.

FIG. 13 is a flow chart illustrating a method 2000 for operating the waterjet system 1100 shown in FIG. 2 in accordance with an embodiment of the present technology. With reference to FIGS. 2 and 13 together, the method 2000 can include drawing fluid from the fluid source 1004 (block 2002), feeding the fluid into the treatment assembly 1012 (block 2004), and then treating the fluid (block 2006) using the treatment assembly 1012. Next, the method 2000 can include feeding the fluid into the reservoir 1002 (block 2008) and drawing the fluid from the reservoir 1002 (block 2010) when needed. The fluid drawn from the reservoir 1002 can be pressurized (block 2012) to a pressure suitable for waterjet processing using the pressurizing device 1006. In at least some cases, the pressurizing device 1006 is a direct-drive plunger pump in the context of the method 2000. Before being treated, the fluid may have a concentration of small colloidal particles that would adversely affect the pressurizing device 1006. Treating the fluid can decrease the concentration of small colloidal particles to a more suitable level for use in the pressurizing device 1006.

After being pressurized, the fluid can be fed into the cutting head 1008 (block 2014) and used to form a jet, such as by passing the fluid through a suitable orifice. Particles of abrasive material (e.g., garnet) can be incorporated into the jet (block 2016) and the jet can be directed toward a workpiece (block 2018). After impacting the workpiece, the jet can diffuse into a fluid pool within the catcher 1010 (block 2020). Impacting the workpiece and/or the fluid pool can cause the particles of abrasive material within the jet to break apart into small fragments that then disperse within the fluid pool as small colloidal particles. The level of fluid within the fluid pool can be monitored and, if the level is above a threshold level, fluid from the fluid pool can be disposed of (block 2022), such as by routing the fluid to the waste destination 1014.

Figure 14:
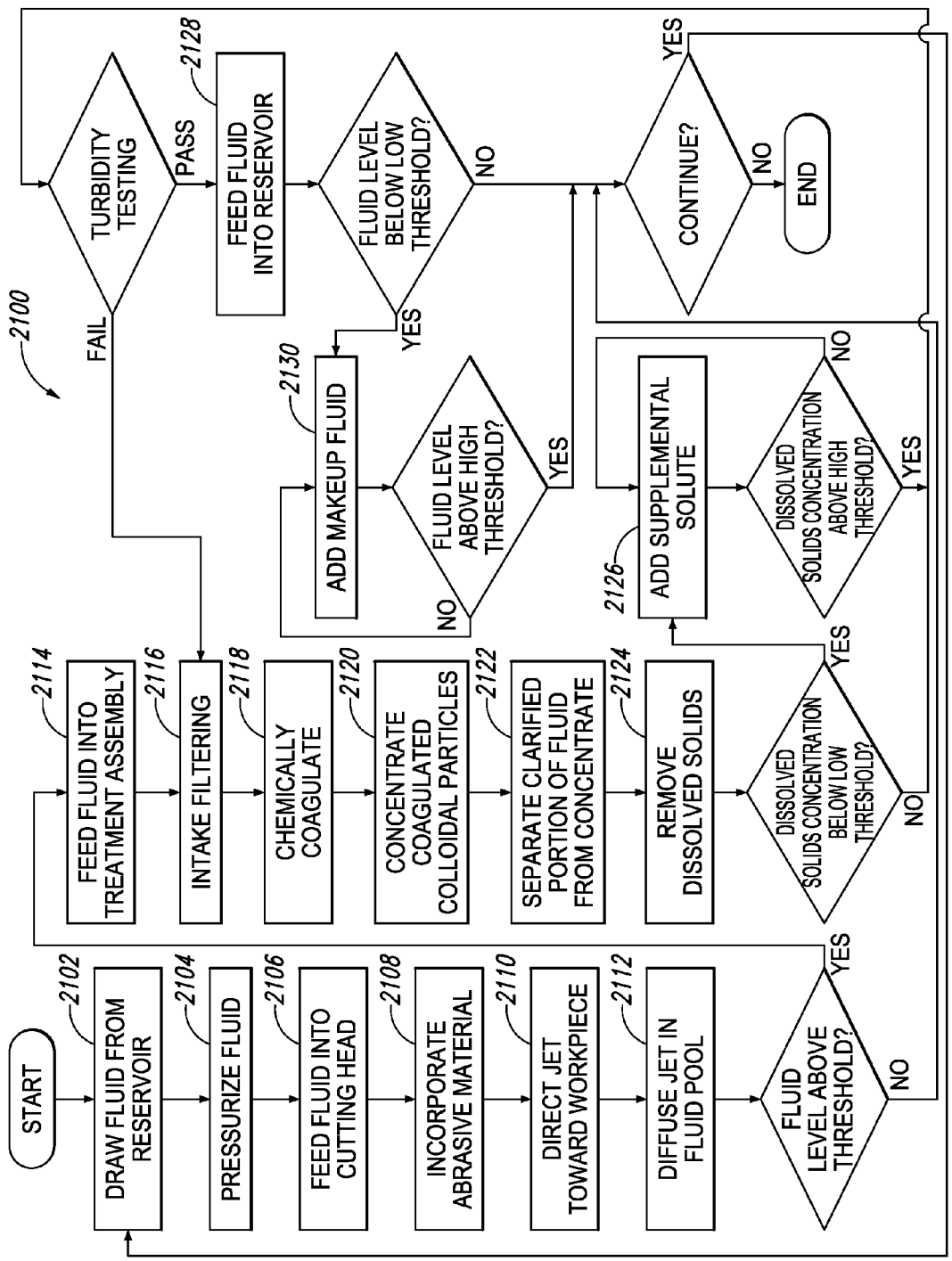
FIG. 14 is a flow chart illustrating a method for operating the waterjet system shown in FIG. 4 in accordance with an embodiment of the present technology.

FIG. 14 is a flow chart illustrating a method 2100 for operating the system 1300 shown in FIG. 4 in accordance with an embodiment of the present technology. With reference to FIGS. 4, 5 and 14 together, the method 2100 can include drawing fluid from the reservoir 1334 (block 2102) into the pressurizing device 1304. Next, the method 2100 can include pressurizing the fluid (block 2104) to a pressure suitable for waterjet processing. In at least some cases, the pressurizing device 1304 is a direct-drive plunger pump in the context of the method 2100. The fluid can then be fed into the cutting head 1306 (block 2106) and used to form a jet, such as by passing the fluid through a suitable orifice. Particles of abrasive material (e.g., garnet) can be incorporated into the jet (block 2108) and the jet can be directed toward a workpiece (block 2110). After impacting the workpiece, the jet can diffuse into a fluid pool within the catcher 1318 (block 2112). Impacting the workpiece and/or the fluid pool can cause the particles of abrasive material within the jet to break apart into small fragments that then disperse within the fluid pool as small colloidal particles.

The level of fluid within the fluid pool can be monitored using the second level sensor 1344 and, if the level is above a threshold level, fluid from the fluid pool can be fed into the treatment assembly 1302 (block 2114). Treating the fluid can begin with intake filtering (block 2116) using the intake filter 1400. Next, small colloidal particles in the fluid can be chemically coagulated (block 2118) using the chemical coagulation unit 1402. As discussed above with reference to FIG. 5, the chemical coagulation unit 1402 can include a first mixing chamber configured for high-speed mixing (e.g., flash mixing) and a second mixing chamber configured for lower speed mixing downstream from the first chamber. The average residence time of the fluid in the first chamber can be relatively short (e.g., less than 1 minute) so as to evenly distribute the chemical coagulant within the fluid without undue shearing of newly formed agglomerations of small colloidal particles. The average residence time of the fluid in the second chamber can be longer (e.g., greater than 1 minute) to promote further coagulation of the small colloidal particles in a low-shear environment. In at least some cases, at least 50% by count of all small colloidal particles of sieve diameter within a range from 0.005 to 0.2 microns in a given volume of the fluid are coagulated. For example, at least 90% by count of all of the submicron fragments of sieve diameter within a range from 0.005 to 0.2 microns in a given volume of the fluid can be coagulated.

The chemical coagulant used to coagulate the small colloidal particles in the fluid can be a salt that is soluble in the fluid at room temperature and neutral pH to form a metallic ion and a counter ion. In at least some cases, the chemical coagulant includes iron, tin, copper, and/or silver. In particular cases, the chemical coagulant includes copper. For example, the chemical coagulant can be copper(II) chloride or copper(II) sulfate. Copper(II) sulfate, in particular, has been found to rapidly and effectively coagulate small colloidal particles of garnet in water with few, if any, undesirable side effects. Certain other chemical coagulants when used in this context have been found, undesirably, to significantly change the pH of the fluid, to significantly increase in the concentration dissolved solids in the fluid, and/or to form excessively voluminous concentrates. The concentration of the metallic ion in the fluid after adding the chemical coagulant can be relatively high. For example, the small colloidal particles within the fluid can be coagulated while a molar concentration of the metallic ion in the fluid is greater than 0.1 millimolar. In some cases, the small colloidal particles within the fluid are coagulated while the molar concentration of the metallic ion in the fluid is greater than 0.2 millimolar, such as within a range from 0.2 millimolar to 0.4 millimolar. Relatively high concentrations of the metallic ion may expedite coagulation. Lower concentrations of the metallic ion can also be used, such as when the speed at which the coagulation occurs is of low importance.

In at least some embodiments of the present technology, when small colloidal particles in a fluid include garnet, the chemical coagulant added to the fluid is a salt soluble in the fluid to form a metallic ion of a metal lower than sodium on the electrochemical series in its standard presentation (i.e., with lithium toward the top and gold toward the bottom). Metals lower than sodium on the electrochemical series include iron, tin, copper, and silver. These and other metals may be bound to various counter ions, such as halogens (e.g., fluorine, chlorine, bromine, or iodine), nitrate, or sulfate, among others. It should be understood that the chemical coagulants (including specific chemical coagulants and classes of chemical coagulants) described above are not exclusive. While these chemical coagulants may be well suited for use in some embodiments of the present technology, in other embodiments, using different chemical coagulants may be advantageous.

After adding the chemical coagulant, the method 2100 can include concentrating the coagulated small colloidal particles (block 2120) into a volume of concentrate (e.g., sludge) using the separation unit 1404. This, in turn, can decrease a concentration of the coagulated small colloidal particles in the remaining fluid, thereby forming a clarified portion of the fluid. Concentrating the coagulated small colloidal particles can be carried out, for example, by filtration, gravity, centrifugation, or a combination thereof. In a particular example, the fluid is filtered using a super-micron filter that traps the coagulated small colloidal particles. A primary flowpath for the fluid through the treatment assembly 1302 may pass through the super-micron filter such that concentrate held in the super-micron filter acts as a trap for gathering additional small colloidal particles that were not previously coagulated. As another example, the fluid may be held in a chamber to allow the coagulated small colloidal particles to settle or float due to gravity. The resulting volume of concentrate can then be collected by skimming, dredging, or a combination thereof.

After concentrating the coagulated small colloidal particles, the method 2100 can include separating a clarified portion of the fluid from the concentrate (block 2122). The concentration of dissolved solids in the clarified portion of the fluid can then be decreased (block 2124). This can include recovering an excess portion of the chemical coagulant in the fluid for recycling to the chemical coagulation unit 1402 or for disposal. For example, dissolved solids can be removed from the fluid by reverse osmosis, nanofiltration, ion exchange or another suitable technique to form a concentrated solution of a metallic ion of the chemical coagulant. Once formed, this concentrated solution can be routed to the chemical coagulation unit 1402 for reuse or routed to the waste destination 1358 for disposal. Alternatively or in addition, the fluid can be contacted with a molecular sieve (e.g., activated carbon) to decrease a concentration of the metallic ion in the fluid. After reducing the concentration of dissolved solids in the fluid, the method 2100 can include measuring the concentration of dissolved solids in the fluid using the dissolved-solids sensor 1412, such as by measuring an electrical property of the fluid. The concentration of dissolved solids in the fluid can be increased based on the measured concentration of dissolved solids. For example, if the concentration of dissolved solids in the fluid is below a threshold, supplemental solute from the supplemental solute supply 1356 can be added to the fluid (block 2126) until the concentration of dissolved solids in the fluid exceeds a high threshold.

The method 2100 can further include measuring a turbidity of the fluid using the turbidity sensor 1416, such as by measuring an optical property of the fluid. If the turbidity measurement is too high (e.g., higher than a turbidity known to be detrimental to the life of seals in the pressurizing device 1304) the fluid can be diverted from a course through the treatment assembly 1302. For example, the fluid can be recirculated through the chemical coagulation unit 1402 via the intake filter 1400. If the turbidity measurement is acceptable, the fluid can be fed into the reservoir 1334 (block 2128) where it can wait to be drawn again into the pressurizing device 1304. The level of the fluid within the reservoir 1334 can be monitored using the first level sensor 1342 and, if the level is below a threshold level, makeup fluid (e.g., municipal water) can be added (block 2130). If the level is above the threshold level or if adding the makeup fluid causes the level to be above the threshold level, addition of makeup fluid can slow, stop, or remain slowed or stopped.

Figure 15:
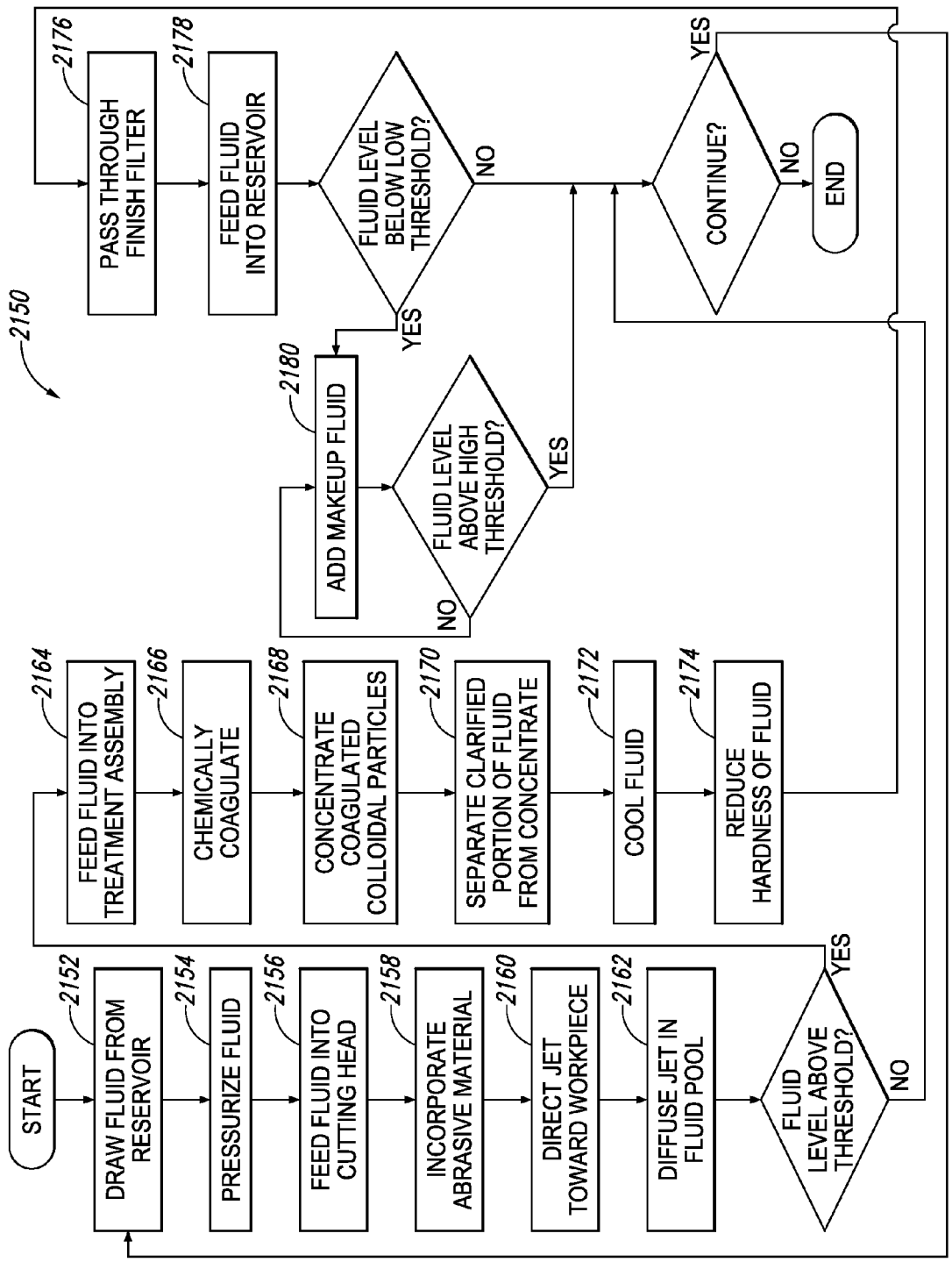
FIG. 15 is a flow chart illustrating a method for operating the waterjet system shown in FIG. 6 in accordance with an embodiment of the present technology.

FIG. 15 is a flow chart illustrating a method 2150 for operating the system 1450 shown in FIG. 6 in accordance with an embodiment of the present technology. With reference to FIGS. 6, 7 and 15 together, the method 2150 can include drawing fluid from the reservoir 1334 (block 2152) into the pressurizing device 1304. Next, the method 2150 can include pressurizing the fluid (block 2154) to a pressure suitable for waterjet processing. In at least some cases, the pressurizing device 1304 is a direct-drive plunger pump in the context of the method 2150. The fluid can then be fed into the cutting head 1306 (block 2156) and used to form a jet, such as by passing the fluid through a suitable orifice. Particles of abrasive material (e.g., garnet) can be incorporated into the jet (block 2158) and the jet can be directed toward a workpiece (block 2160). After impacting the workpiece, the jet can diffuse into a fluid pool within the catcher 1318 (block 2162). Impacting the workpiece and/or the fluid pool can cause the particles of abrasive material within the jet to break apart into small fragments that then disperse within the fluid pool as small colloidal particles.

The level of fluid within the fluid pool can be monitored using the second level sensor 1344 and, if the level is above a threshold level, fluid from the fluid pool can be fed into the treatment assembly 1452 (block 2164). Within the treatment assembly 1452, small colloidal particles in the fluid can be chemically coagulated (block 2166) and the resulting coagulated small colloidal particles can be concentrated (block 2168) into a volume of concentrate (e.g., sludge). As discussed above with reference to FIG. 7, these operations can occur contemporaneously within the first and second weirs 1470, 1472. In some cases, the fluid spends less time in the first weir 1470 than in the second weir 1472 and/or is subjected to greater turbulence in the first weir 1470 than in the second weir 1472. For example, the average residence time of the fluid in the first weir 1470 can be relatively short (e.g., less than 1 minute) to reduce or prevent undue shearing of newly formed agglomerations of small colloidal particles. The average residence time of the fluid in the second weir 1472 can be longer (e.g., greater than 1 minute) to promote further coagulation of the small colloidal particles in a low-shear environment. In other cases the fluid is processed within the first and second weirs 1470, 1472 in another suitable manner.

The chemical coagulant used to coagulate the small colloidal particles in the fluid and the concentration of the chemical coagulant can be the same as or similar to those described above with reference to FIG. 14. In at least some cases, at least 50% by count of all small colloidal particles of sieve diameter within a range from 0.005 to 0.2 microns in a given volume of the fluid are coagulated. For example, at least 90% by count of all of the submicron fragments of sieve diameter within a range from 0.005 to 0.2 microns in a given volume of the fluid can be coagulated. After concentrating the coagulated small colloidal particles, the method 2150 can include separating a clarified portion of the fluid from the concentrate (block 2170), such as at the coarse filter 1474. The fluid can then be cooled (block 2172), softened (2174), and finish filtered (block 2176). After finish filtering, the fluid can be fed into the reservoir 1334 (block 2178) where it can wait to be drawn again into the pressurizing device 1304. The level of the fluid within the reservoir 1334 can be monitored using the first level sensor 1342 and, if the level is below a threshold level, makeup fluid (e.g., municipal water) can be added (block 2180). If the level is above the threshold level or if adding the makeup fluid causes the level to be above the threshold level, addition of makeup fluid can slow, stop, or remain slowed or stopped.

Figure 16:
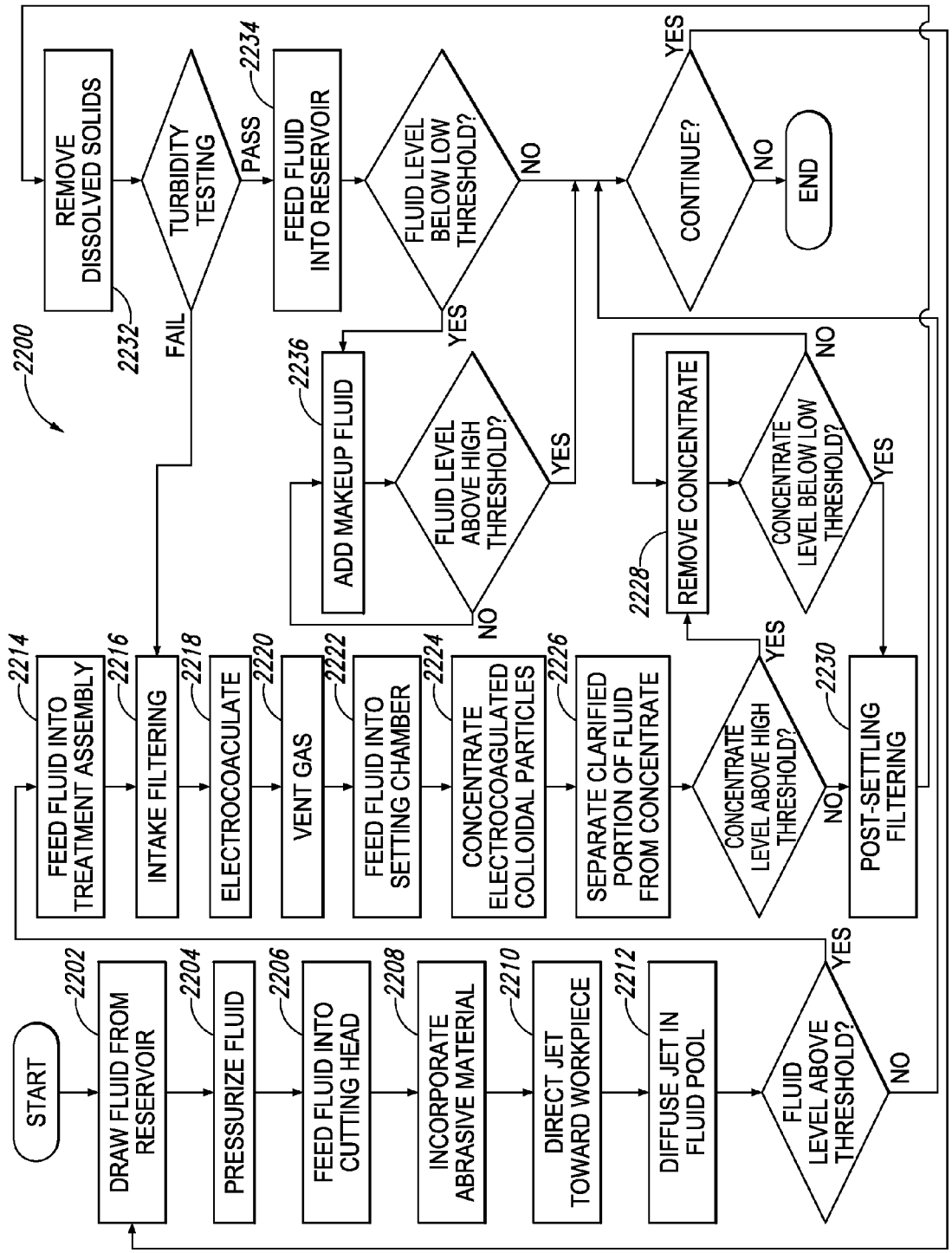
FIG. 16 is a flow chart illustrating a method for operating the waterjet system shown in FIG. 8 in accordance with an embodiment of the present technology.

FIG. 16 is a flow chart illustrating a method 2200 for operating the system 1500 shown in FIG. 8 in accordance with an embodiment of the present technology. With reference to FIGS. 8, 9 and 16 together, the method 2200 can include drawing fluid from the reservoir 1334 (block 2202) into the pressurizing device 1304. Next, the method 2200 can include pressurizing the fluid (block 2204) to a pressure suitable for waterjet processing. In at least some cases, the pressurizing device 1304 is a direct-drive plunger pump in the context of the method 2200. The fluid can then be fed into the cutting head 1306 (block 2206) and used to form a jet, such as by passing the fluid through a suitable orifice. Particles of abrasive material (e.g., garnet) can be incorporated into the jet (block 2208) and the jet can be directed toward a workpiece (block 2210). After impacting the workpiece, the jet can diffuse into a fluid pool (block 2212) within the catcher 1318. Impacting the workpiece and/or the fluid pool can cause the particles of abrasive material within the jet to break apart into small fragments that then disperse within the fluid pool as small colloidal particles.

The level of fluid within the fluid pool can be monitored using the second level sensor 1344 and, if the level is above a threshold level, fluid from the fluid pool can be fed into the treatment assembly 1502 (block 2214). Treating the fluid can begin with intake filtering (block 2216) using the intake filter 1400. Next, small colloidal particles in the fluid can be electrocoagulated (block 2218). As discussed above with reference to FIG. 10, electrocoagulating the small colloidal particles can include flowing the fluid upward along one or more of the flowpaths 1708. In some embodiments, the fluid is flowed at a steady-state flowrate from 1 to 1.5 gallons per minute causing the fluid to move upward along one or more of the flowpaths 1708 at a speed of 4 to 6 inches per minute. The fluid can have an average residence time between the first and second electrodes 1704, 1706, for example, from 12 minutes to 18 minutes. In other embodiments, the fluid can be flowed at another suitable rate. In comparison to the average residence time of the fluid between the first and second electrodes 1704, 1706, the average residence time of the electrocoagulated colloidal particles between the first and second electrodes 1704, 1706 may be the about same, lower (e.g., due to the buoyancy of associated bubbles of gas), or higher (e.g., due to settling). After exiting the electrocoagulation unit 1600, gas produced in association with the electrocoagulation can be vented (block 2220) and the fluid can be fed into the settling chamber 1606 (block 2222). In some embodiments, at least 99% of the total amount of gas formed at steady state is vented. In other embodiments, a lesser amount of gas may be vented. The fluid can be introduced into the settling chamber 1606 via the fluid inlet 1806 below the interface 1822.

Within the settling chamber 1606, the electrocoagulated small colloidal particles can be concentrated to form a settled volume of concentrate (block 2224) and the fluid, in a clarified state, can be separated from the settled volume of concentrate (block 2226). For example, the electrocoagulated colloidal particles can be settled by gravity into the lower portion of the settling chamber 1606. The fluid, in a clarified state, can be output from the upper portion of the settling chamber 1606 via the second fluid outlet 1824 above the interface 1822. The level of the interface 1822 within the settling chamber 1606 can be monitored using the third level sensor 1826 and, if the level is above a threshold level, concentrate can be removed from the settled volume of concentrate (block 2228). If the level is below the threshold level or if removing the concentrate causes the level to be below the threshold level, removal of the concentrate can slow or stop or remain slowed or stopped. The concentrate can removed from the lower portion of the settling chamber 1606 at a rate that causes the fluid inlet 1806 to remain below the interface 1822 and the catcher outlet 1332 to remain above the interface 1822. This rate at which the concentrate is removed, for example, can be a continuous rate or a non-continuous (e.g., periodic) rate.

After exiting the settling chamber 1606, the fluid can be subjected to post-settling filtering (block 2230) using the post-settling filter 1608. Next, the concentration of dissolved solids in the fluid can be decreased (block 2232) using the dissolved-solids removal unit 1406. The method 2200 can further include measuring a turbidity of the fluid using the turbidity sensor 1416, such as by measuring an optical property of the fluid. If the turbidity measurement is too high (e.g., higher than a turbidity known to be detrimental to the life of seals in the pressurizing device 1304) the fluid can be diverted from a course through the treatment assembly 1502. For example, the fluid can be recirculated through the electrocoagulation unit 1600 via the intake filter 1400. If the turbidity measurement is acceptable, the fluid can be fed into the reservoir 1334 (block 2234) where it can wait to be drawn again into the pressurizing device 1304. The level of the fluid within the reservoir 1334 can be monitored using the first level sensor 1342 and, if the level is below a threshold level, makeup fluid (e.g., municipal water) can be added (block 2236). If the level is above the threshold level or if adding the makeup fluid causes the level to be above the threshold level, addition of makeup fluid can slow, stop, or remain slowed or stopped.

With reference to FIGS. 3-9 and 14-16 together, the methods 2100, 2150, 2200 can include circulating fluid (e.g., as process fluid, contaminated fluid, clarified fluid, etc.) within a fluid-recycling loop corresponding to the fluid-recycling loop 1202 shown in FIG. 3. Pressurizing the fluid in the methods 2100, 2150, 2200 can occur at the first portion 1202a of the fluid-recycling loop 1202. Feeding the fluid into the cutting head 1306, forming the fluid into a jet, incorporating abrasive material into the jet, and directing the jet toward a workpiece in the methods 2100, 2150, 2200 can occur at the second portion 1202b of the fluid-recycling loop 1202. Treating the fluid and measuring the concentration of dissolved solids in the fluid in the methods 2100, 2150, 2200 can occur at the third portion 1202c of the fluid-recycling loop 1202. Measuring the turbidity of the fluid and feeding the fluid into the reservoir 1334 in the methods 2100, 2150, 2200 can occur at the fourth portion 1202d of the fluid-recycling loop 1202. The methods 2100, 2150, 2200 may cause relatively little fluid loss. Thus, makeup fluid may be added at a relatively low rate, such as a steady-state flowrate less than 2% of an overall steady-state flowrate of the fluid through the fluid-recycling loop 1202. The methods 2100, 2150, 2200 can include reducing a turbidity of a fluid a relatively large amount, such as from a first turbidity greater than 1000 nephelometric turbidity units to a second turbidity less than 5 nephelometric turbidity units, such as less than 3 nephelometric turbidity units, or, in some cases, less than 1 nephelometric turbidity unit. In contrast, with reference to FIG. 12, the method 1900 can include reducing a turbidity of a fluid a relatively small amount, such as from a first turbidity within a range from 2 nephelometric turbidity units to 10 nephelometric turbidity units to a second turbidity less than 2 nephelometric turbidity units, such as less than 1 nephelometric turbidity unit, or, in some cases, less than 0.5 nephelometric turbidity unit. Other specifications may apply in other embodiments.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. Accordingly, this disclosure and associated technology can encompass other embodiments not expressly shown or described herein. In some cases, well-known structures and functions have not been shown or described in detail to avoid unnecessarily obscuring the description of embodiments of the present technology. Although steps of methods may be presented herein in a particular order, in alternative embodiments, the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology.

Certain aspects of the present technology may take the form of computer-executable instructions, including routines executed by a controller or other data processor. In some embodiments, a controller or other data processor is specifically programmed, configured, or constructed to perform one or more of these computer-executable instructions. Furthermore, some aspects of the present technology may take the form of data (e.g., non-transitory data) stored or distributed on computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of making and using the disclosed apparatuses and systems, methods of instructing others to make and use the disclosed apparatuses and systems. For example, a method in accordance with a particular embodiment includes pressurizing a fluid to a pressure greater than 30,000 psi, forming the fluid into a jet, directing the jet toward a workpiece, and treating a resulting fluid. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A waterjet system, comprising:
 a pressurizing device configured to pressurize a fluid;
 a cutting head positioned downstream from the pressurizing device, wherein the cutting head is configured to direct a jet including the fluid toward a workpiece, and wherein the cutting heat includes an orifice configured to form the jet;
 a catcher positioned to collect the jet; and a treatment assembly configured
to receive the fluid from the catcher,
to chemically coagulate submicron colloidal particles within the fluid, and
to concentrate the chemically coagulated submicron colloidal particles,
wherein the treatment assembly, the pressurizing device, the orifice, and the catcher are operably associated with one another in series within a fluid-recycling loop.

2. The system of claim 1, further comprising a reservoir within the fluid-recycling loop downstream from the treatment assembly and upstream from the pressurizing device.

3. The system of claim 1 wherein the pressurizing device is configured to pressurize the fluid to a pressure within a range from 30,000 psi to 120,000 psi.

4. The system of claim 1 wherein the treatment assembly includes:
a chemical coagulation unit containing a chemical coagulant;
the chemical coagulant is soluble in the fluid to form a metallic ion and a counter ion; and
the metallic ion includes iron, tin, copper, silver, or a combination thereof.

5. The system of claim 4 wherein the metallic ion includes copper.

6. The system of claim 4 wherein the chemical coagulant is copper(II) sulfate.

7. The system of claim 1 wherein the treatment assembly includes:
a chemical coagulation unit; and
a dissolved-solids removal unit positioned downstream from the chemical coagulation unit.

8. The system of claim 7 wherein the dissolved-solids removal unit is configured to decrease a concentration of dissolved solids in the fluid by contacting the fluid and a molecular sieve.

9. The system of claim 7 wherein the dissolved-solids removal unit is configured to decrease a concentration of dissolved solids in the fluid by nanofiltration.

10. The system of claim 9 wherein the treatment assembly includes a recycling conduit configured to carry a concentrated solution of dissolved solids from the dissolved-solids removal unit to the chemical coagulation unit.

11. The system of claim 7, further comprising a dissolved-solids sensor operably connected to the fluid-recycling loop downstream from the dissolved-solids removal unit and upstream from the pressurizing device.

12. The system of claim 11 wherein the dissolved-solids sensor is configured to measure an electrical property of the fluid.

13. A waterjet system, comprising:
a pressurizing device configured to pressurize a fluid;
a cutting head positioned downstream from the pressurizing device, wherein the cutting head is configured to direct a jet including the fluid toward a workpiece;
a catcher positioned to collect the jet;
a treatment assembly configured to receive the fluid from the catcher, configured to chemically coagulate submicron colloidal particles within the fluid, and configured to concentrate the chemically coagulated submicron colloidal particles, wherein the treatment assembly, the pressurizing device, the cutting head, and the catcher are operably associated with one another in series within a fluid-recycling loop;
a dosing unit operably connected to the fluid-recycling loop downstream from the dissolved-solids sensor and upstream from the pressurizing device, wherein the dosing unit is configured to increase a concentration of dissolved solids within the fluid; and
a controller operably associated with the dissolved-solids sensor and with the dosing unit, the controller including memory and processing circuitry, the memory storing instructions that, when executed by the controller using the processing circuitry, cause the controller to operate the dosing unit to increase the concentration of dissolved solids in the fluid in response to an indication from the dissolved-solids sensor that the concentration of dissolved solids in the fluid is below a threshold.

14. The system of claim 1 wherein the treatment assembly includes:
a chemical coagulation unit; and
a separation unit positioned downstream from the chemical coagulation unit, wherein the separation unit is configured to separate the concentrated chemically coagulated submicron colloidal particles from the fluid.

15. The system of claim 14 wherein the separation unit includes an in-stream filter.

16. The system of claim 15 wherein the in-stream filter is a super-micron filter.

17. The system of claim 14 wherein the separation unit includes a settling chamber.

18. A waterjet system, comprising:
a treatment assembly configured to receive feed fluid having a turbidity greater than 1000 nephelometric turbidity units and further configured to coagulate and remove submicron colloidal particles from the feed fluid and thereby reduce a turbidity of the feed fluid to less than 5 nephelometric turbidity units;
a reservoir downstream from the treatment assembly, wherein the reservoir is configured to receive treated fluid from the treatment assembly;
a pump downstream from the reservoir, wherein the pump is configured to receive the treated fluid from the reservoir;
a jet-forming orifice downstream from the pump, wherein the jet-forming orifice is configured to receive treated and pressurized fluid from the pump and further configured to form the treated and pressurized fluid into a jet directed toward a workpiece; and
a catcher positioned to collect the jet, wherein the catcher is separate from the reservoir.

19. The system of claim 18 wherein the pump is a direct-drive pump.

20. The system of claim 18 wherein the pump is configured to pressurize the treated fluid to a pressure within a range from 30,000 psi to 120,000 psi.

21. The system of claim 18 wherein the treatment assembly includes an in-stream filter configured to concentrate the coagulated submicron colloidal particles.

22. A waterjet system, comprising:
a treatment assembly configured to receive feed fluid and further configured to coagulate at least 90% by count of submicron colloidal particles of sieve diameter within a range from 0.005 to 0.2 microns in the feed fluid;
a reservoir downstream from the treatment assembly, wherein the reservoir is configured to receive treated fluid from the treatment assembly;
a pump downstream from the reservoir, wherein the pump is configured to receive the treated fluid from the reservoir;
a jet-forming orifice downstream from the pump, wherein the jet-forming orifice is configured to receive treated and pressurized fluid from the pump and further configured to form the treated and pressurized fluid into a jet directed toward a workpiece; and a catcher positioned to collect the jet, wherein the catcher is separate from the reservoir.

23. The system of claim 22 wherein the pump is a direct-drive pump.

24. The system of claim 22 wherein the pump is configured to pressurize the treated fluid to a pressure within a range from 30,000 psi to 120,000 psi.

25. The system of claim 22 wherein the treatment assembly includes an in-stream filter configured to concentrate the coagulated submicron colloidal particles.

* * * * *